United States Patent [19]
Horibe et al.

[11] Patent Number: 5,756,221
[45] Date of Patent: May 26, 1998

[54] COATING METHOD

[75] Inventors: Kyoichi Horibe; Hidehiko Haneishi, both of Hiratsuka; Masaru Mitsuji, Zama; Motoshi Yabuta, Hadano; Yasumasa Okumura, Yokohama, all of Japan

[73] Assignee: Kansai Paint Co., Ltd., Hyogo-ken, Japan

[21] Appl. No.: 785,600

[22] Filed: Jan. 17, 1997

[30] Foreign Application Priority Data

Jan. 22, 1996 [JP] Japan .................... 8-026244

[51] Int. Cl.$^6$ .................... C25D 13/06
[52] U.S. Cl. .................... 428/626; 428/416; 204/488; 204/501
[58] Field of Search .................... 204/486, 487, 204/488, 501; 523/415; 428/626, 416

[56] References Cited

U.S. PATENT DOCUMENTS

| | | | |
|---|---|---|---|
| 4,981,759 | 1/1991 | Nakatani et al. | 428/626 |
| 5,223,495 | 6/1993 | Inoue et al. | 524/188 |
| 5,472,998 | 12/1995 | Tessmer et al. | 523/404 |

FOREIGN PATENT DOCUMENTS

| | | |
|---|---|---|
| 0545353 | 6/1993 | European Pat. Off. . |
| 0705888 | 4/1996 | European Pat. Off. . |

OTHER PUBLICATIONS

Database WPI, Section Ch, Week 8906, Derwent Publications Ltd., London, GB; Class A32, AN 89-044158 XP002030184 & JP 63 317 695A (Kansai Paint Co Ltd), Dec. 26, 1988.

Chemical Abstract 1997: 502724 (no month available).

Primary Examiner—Kathryn L. Gorgos
Assistant Examiner—Kishor Mayekar
Attorney, Agent, or Firm—Wenderoth, Lind & Ponack

[57] ABSTRACT

The present invention provides a coating method which comprises applying, onto a material to be coated, a cationic electrodepositable coating composition comprising (A) a polyurethane-modified epoxy resin-amine adduct obtained by a reaction of (A-1) a polyurethane-compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule; (A-2) a bisphenol type epoxy resin having at least two epoxy groups in the molecule; and (A-3) an active-hydrogen-containing amine compound, and (B) a nonionic film-forming resin, the weight ratio of the resin (A)/the resin (B) being 15/85 to 95/5 and the coating composition comprising substantially no pigment, then heat-curing the formed electrocoating film; and thereafter applying, onto the cured electrocoating film, an aqueous coating composition comprising a metallic pigment and/or a coloring pigment and a high-solid-content coating composition comprising (C) a carboxyl group-containing compound, (D) a vinyl type polymer containing, in the molecule, an epoxy group, a hydroxyl group and a hydrolyzable alkoxysilyl group, (E) a reactive organopolysiloxane, and (F) crosslinked polymer fine particles but comprising substantially no pigment, by two-coat two-bake or by two-coat one-bake.

52 Claims, No Drawings

COATING METHOD

BACKGROUND OF THE INVENTION

1. Field of the Invention

The present invention relates to a coating method which can be applied in a simple operation, which can form a coating film greatly superior in finish appearance, corrosion resistance, wheatherability, chipping resistance, acid resistance, abrasion resistance, etc., and which is advantageous in resource saving and pollution control.

2. Description of Prior Art

Body panels of automobiles, bicycles, electric appliances, etc. wherein fine appearance is required, are generally subjected to finish coating with an organic solvent type thermosetting coating composition capable of forming a coating film superior in smoothness, distinctness of image gloss, weatherability, etc. This finish coating step generally comprises, after the application of a cationic electrodepositable coating composition for imparting of corrosion resistance, the application of an intermediate coating composition for imparting of weatherability and the heat-curing of the above-formed two coating films, applying two top coats onto the two coating films, that is, applying an organic solvent type thermosetting enamel coating composition comprising a coloring pigment and/or a metallic pigment (the coating composition is hereinafter referred to as "base coat"), air-drying the formed base coat film, applying thereonto an organic solvent type thermosetting transparent clear coating composition, and heat-curing the base coat film and the formed clear coating film simultaneously (this finish coating step is called "two-coat one-bake").

In recent years, the requirement for improved finish appearance (e.g. improved smoothness, distinctness of image gloss an fattiness) has become stronger and, moreover, there are required resource saving, pollution control and a lower application cost.

The improved finish appearance is achieved mainly by addition of appropriate rheology-controlling agent for smoothening of top coating film or by grinding of intermediate coating film.

However, addition of rheology-controlling agent has a limit in improvement of smoothness and distinctness of coating film and provides no basic solution. Meanwhile, grinding of intermediate coating film leads to an increase in number of steps and gives no sufficient improvement in appearance. Moreover, conventional organic solvent type base coats contain a large amount of an organic solvent, which is not desirable from the standpoints of resource saving and pollution control.

There was also attempted a coating method of applying a cationic electrodepositable coating composition, an intermediate coating composition, an aqueous metallic base and a powder clear coating composition in this order. This method, however, invites a high total cost in view of the number of steps.

SUMMARY OF THE INVENTION

Under the above circumstance, the present inventors made an intensive study with an aim of developing a coating method which is free from the above-mentioned problems of the prior art, which can be applied in a simple operation, which can form a coating film greatly superior in finish appearance, corrosion resistance, wheatherability, chipping resistance, etc., and which is advantageous in resource saving and pollution control.

As a result, the present inventors found out that the above aim could be achieved by using a clear cationic electrodepositable coating composition of particular formulation, having excellent weatherability, an aqueous base coat, and a high-solid-content coating composition (a top coat) of particular formulation, capable of forming a coating film having excellent weatherability, acid resistance and abrasion resistance, without using any intermediate coating composition. The present invention has been completed based on the above finding.

DETAILED DESCRIPTION OF THE INVENTION

According to the first aspect of the present invention, there is provided a coating method comprising:

(1) applying, onto a material to be coated, a cationic electrodepositable coating composition comprising:
  (A) a polyurethane-modified epoxy resin-amine adduct obtained by a reaction of (A-1) a polyurethane compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule; (A-2) a bisphenol type epoxy resin having at least two epoxy groups in the molecule; and (A-3) an active-hydrogen-containing amine compound, and
  (B) a nonionic film-forming resin, the weight ratio of the resin (A)/the resin (B) being 15/85 to 95/5 and the coating composition comprising substantially no pigment, and then heat-curing the formed electrocoating film, (2) applying, onto the cured electrocoating film, an aqueous coating composition comprising a metallic pigment and/or a coloring pigment, as a first top coat, and then heat-curing the formed coating film, and (3) applying thereonto, as a second top coat, a high-solid-content coating composition comprising:
  (C) a carboxyl group-containing compound,
  (D) a vinyl type polymer containing, in the molecule, an epoxy group, a hydroxyl group and a hydrolyzable alkoxysilyl group,
  (E) a reactive organopolysiloxane, and
  (F) crosslinked polymer fine particles but comprising substantially no pigment, and then heat-curing the formed coating film.

According to the second aspect of the present invention, a coating method comprising:

(1) applying, onto a material to be coated, a cationic electrodepositable coating composition comprising:
  (A) a polyurethane-modified epoxy resin-amine adduct obtained by a reaction of (A-1) a polyurethane compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule; (A-2) a bisphenol type epoxy resin having at least two epoxy groups in the molecule; and (A-3) an active-hydrogen-containing amine compound, and
  (B) a nonionic film-forming resin, the weight ratio of the resin (A)/the resin (B) being 15/85 to 95/5 and the coating composition comprising substantially no pigment, and then heat-curing the formed electrocoating film, (2) applying, onto the cured electrocoating film, an aqueous coating composition comprising a metallic pigment and/or a coloring pigment, as a first top coat, and without substantially heat-curing the formed coating film, (3) applying thereonto, as a second top coat, a high-solid-content coating composition comprising:
(C) a carboxyl group-containing compound,
(D) a vinyl type polymer containing, in the molecule, an epoxy group, a hydroxyl group and a hydrolyzable alkoxysilyl group,
(E) a reactive organopolysiloxane, and
(F) crosslinked polymer fine particles but comprising substantially no pigment, and (4) heating the resulting material to simultaneously cure the coating films formed in the above (2) and (3).

One of the features of the present invention lies in applying, on the film of the clear cationic electrodepositable coating composition of particular formulation having excellent weatherability, formed in the above step (1), two coating compositions mentioned in the above steps (2) and (3), as a top coat by two-coat two-bake (the first aspect of the present invention) or by two-coat one-bake (the second aspect of the present invention), without applying any intermediate coating composition (an intermediate coating composition is applied ordinarily).

The present invention has various advantages such as mentioned below.

1. The clear cationic electrodepositable coating composition used in the present invention, mentioned in the above step (1) comprises (A) a polyurethane-modified epoxy-amine adduct obtained by modifying an epoxy resin of excellent corrosion resistance with a urethane compound of excellent weatherability and chipping resistance and (B) a nonionic film-forming resin having excellent weatherability, but comprises substantially no coloring pigment or no extender pigment. Therefore, the coating film formed by electrodeposition using a bath containing the above coating composition is superior in corrosion resistance, weatherability and chipping resistance.

2. It was found out that in the present coating method, the direct application of two top coating compositions onto the baked and cured film of the clear cationic electrodepositable coating composition according to the above steps (2) and (3), without the application of any intermediate coating composition gives rise to no weather-induced separation between films (the separation is a phenomenon that a primer film and a top coat film are separated from each other during outdoor exposure owing to the photo-deterioration of the primer film caused by a light passing through the top coat film. Moreover, in the present coating method, no application of intermediate coating composition makes simple the total application operation and gives a low application cost.

3. The aqueous coating composition used in the step (2) is a metallic or solid color coating composition comprising water as the solvent or dispersing agent but comprising no or substantially no organic solvent and, therefore, is very effective for resource saving and pollution control. Further, since the aqueous coating composition is used generally in a low solid content, the volume contraction thereof during the period from application to curing is large and the scaly metallic pigment contained therein tends to be oriented parallel to the film surface, whereby a coating film with glittering metallic feeling can be formed easily; furthermore, the uneven coating film surface appearing when the aqueous coating composition is applied, is smoothened easily in spite of the solid color finish, whereby a coating film superior in smoothness, distinctness of image gloss, etc. is formed.

4. The high-solid-content coating composition used in the step (3), applied on the coating film of the aqueous coating composition contains an organic solvent in a small amount and, therefore, is effective for resource saving and pollution control similarly to the aqueous coating composition; moreover, the high-solid-content coating composition can give a coating film superior in weatherability, finish appearance (e.g. distinctness of image gloss), acid resistance and abrasion resistance.

The coating method according to the present invention is hereinafter described in more detail.

Step (1)

The step (1) is a step of applying, onto a material to be coated, a cationic electrodepositable coating composition comprising:

(A) a polyurethane-modified epoxy resin-amine adduct obtained by a reaction of (A-1) a polyurethane compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule; (A-2) a bisphenol type epoxy resin having at least two epoxy groups in the molecule; and (A-3) an active-hydrogen-containing amine compound, and (B) a nonionic film-forming resin, the weight ratio of the resin (A)/the resin (B) being 15/85 to 95/5 and the coating composition comprising substantially no pigment, and then heat-curing the formed electrocoating film.

The polyurethane compound (A-1) is obtained by a reaction of (a) a polyhydroxy compound, (b) a polyisocyanate compound and (c) a compound having one active hydrogen atom in the molecule, and has one terminal isocyanate group in the molecule. It desirably has a number-average molecular weight of generally 400–10,000, preferably 700–7,000, more preferably 1,000–4,000.

As to the polyhydroxy compound (a), there is no particular restriction and there can be used any compound as long as it has at least two alcoholic hydroxyl groups in the molecule and has a number-average molecular weight of 50–8,000, particularly 50–6,000, more particularly 50–3,000 and hydroxyl equivalents of 25–4,000, particularly 25–3,000, more particularly 25–2,000. The polyhydroxy compound (a) includes, for example, a polyhydric alcohol, a polyester polyol or a polyether polyol both ordinarily used in the production of a polyurethane resin, and a mixture thereof.

The polyhydric alcohol can be exemplified by dihydric alcohols such as ethylene glycol, propylene glycol, butanediol, diethylene glycol, 3-methyl-1,5-pentanediol, 1,6-hexanediol, N-methyl-diethanolamine, N-ethyl-diethanolamine and the like; trihydric alcohols such as glycerine, trimethylolpropane, triethanolamine and the like; and tetrahydric alcohols such as pentaerythritol and the like.

The polyester polyol includes, for example, a condensation product between polyhydric alcohol and polybasic carboxylic acid, a self-condensation product of hydroxycarboxylic acid, a condensation product between hydroxycarboxylic acid and polyhydric alcohol, and a compound obtained by ring opening of a cyclic lactone. The polyhydric alcohol can be the same as mentioned above; and the polybasic carboxylic acid to be condensed with the polyhydric alcohol includes, for example, adipic acid, azelaic acid, a dimer acid, glutaric acid and pyromellitic acid. The hydroxycarboxylic acid includes, for example, dimethylolpropionic acid. As the condensation product between hydroxycarboxylic acid and polyhydric alcohol, besides condensation products between above-mentioned hydroxycarboxylic acid and above-mentioned polyhydric alcohol, there can also be used castor oil and reaction products between castor oil and ethylene glycol, propylene glycol or the like.

The polyether polyol includes compounds obtained by subjecting to addition polymerization (1) at least one alkylene oxide such as ethylene oxide, propylene oxide, butylene oxide, tetrahydrofuran or the like and (2) a compound having two or more active hydrogen atoms. As the polyether polyol, there can be used any per se known polyether polyol ordinarily used in the production of a polyurethane resin. The compound (2) having two or more active hydrogen atoms includes, for example, the above-mentioned polyhydric alcohols and polybasic carboxylic acids; amines such as ethylenediamine, hexamethylene-diamine and the like; alkanolamines such as ethanolamine, propanolamine and the like; polyhydric alcohols such as bisphenol and the like; and castor oil.

Of these polyhydroxy compounds (a), particularly preferable are ethylene glycol, propylene glycol, 1,6-hexanediol and N-methyl-diethanolamine.

The polyhydroxy compound (a) can be used as a single compound or in combination of two or more compounds, as long as the compound(s) used has (have) a number-average molecular weight of 50–8,000, preferably 50–6,000.

The polyisocyanate compound (b) used in production of the polyurethane compound (A-1) is a compound having two or more, preferably two or three isocyanate groups in the molecule. As the compound (b), there can be used those generally used in production of a polyurethane resin. Such a polyisocyanate compound (b) includes polyisocyanate compounds of aliphatic type, alicyclic type, aromatic-aliphatic type, etc. Typical examples of the polyisocyanate compound (b) are as follows.

Aliphatic polyisocyanate compounds such as hexamethylene diisocyanate (HMDI), biuret-type adduct of HMDI, isocyanurate of HMDI and the like; alicyclic polyisocyanate compounds such as isophorone diisocyanate (IPDI), biuret-type adduct of IPDI, isocyanurate of IPDI, hydrogenated xylylene diisocyanate, hydrogenated 4,4'-diphenylmethane diisocyanate and the like; and aromatic-aliphatic polyisocyanate compounds such as tolylene diisocyanate, xylylene diisocyanate and the like. Of these, particularly preferable are HMDI, IPDI and hydrogenated 4,4'-diphenylmethane diisocyanate.

The polyisocyanate compound (b) can be used as a single compound or in combination of two or more compounds.

The compound (c) having one active hydrogen atom in the molecule, used in production of the polyurethane compound (A-1) is used for blocking of the isocyanate groups present in the polyisocyanate compound (b). As the compound (c), there can be used such a compound that separates from the blocked isocyanate at the baking temperature (generally 120°–200° C., preferably 160°–180° C.) of a coating film formed in the step (1) with the cationic electrodepositable coating composition, to generate free isocyanate groups.

The active-hydrogen-containing compound (c) includes, for example, a monohydric alcohol such as methanol, ethanol, diethylene glycol monobutyl ether or the like; a monocarboxylic acid such as acetic acid, propionic acid or the like; a monohydric thiol such as ethyl mercaptan or the like; a secondary amine such as dialkylamine (e.g. diethylamine) or the like; a compound obtained by reacting the primary amino group of an amine compound having one secondary amino or hydroxyl group and one or more primary amino group (said amine compound can be exemplified by polyalkylenepolyamines such as diethylenetriamine and the like and monoalkanolamines such as monoethanolamine and the like), with a ketone (e.g. acetone or methyl ethyl ketone), an aldehyde (e.g. formaldehyde, acetaldehyde or propionaldehyde) or a carboxylic acid (e.g. formic acid, acetic acid or propionic acid) at a temperature of, for example, 100°–230° C. to convert into an aldimine, a ketimine, oxazoline or imidazoline; and an oxime such as methyl ethyl ketoxime or the like. Of these compounds, diethylene glycol monobutyl ether, ethanol and monoethanolamine are particularly preferable. These active-hydrogen-containing compounds (c) desirably have a molecular weight of generally 30–2,000, particularly 30–1, 000, more particularly 30–200.

The polyhydroxy compound (a), the polyisocyanate compound (b) and the active-hydrogen-containing compound (c) are reacted with each other, whereby a polyurethane compound (A-1) can be obtained. The appropriate proportions of the components (a), (b) and (c) are generally as follows based on the total amount of (a), (b) and (c).

Polyhydroxy compound (a): 10–94% by weight, preferably 30–80% by weight, more preferably 30–60% by weight Polyisocyanate compound (b): 5–80% by weight, preferably 10–60% by weight, more preferably 10–50% by weight Active-hydrogen-containing compound (c): 1–85% by weight, preferably 1–60% by weight, more preferably 1–50% by weight There is no particular restriction as to the method of the reaction between the polyhydroxy compound (a), the polyisocyanate compound (b) and the active-hydrogen-containing compound (c). The reaction can be conducted, for example, by (1) a method which comprises mixing and reacting the three components (a), (b) and (c) simultaneously, or (2) a method which comprises first reacting the components (b) and (c) and then reacting the reaction product with the component (a). In any reaction method, the proportions of the individual components (a), (b) and (c) and the reaction orders of the components are controlled so that the resulting polyurethane (A-1) can have one terminal isocyanate group in the molecule.

The method (2) is preferable. Specifically, the method (2) is conducted by reacting the polyisocyanate compound (b) with the active-hydrogen-containing compound (c) in such proportions that the amount of the active-hydrogen-containing group of the compound (c) becomes 1 equivalent or less, preferably 0.1–0.5 equivalent, more preferably 0.1–0.17 equivalent per one isocyanate group of the compound (b), until the unreacted active-hydrogen-containing group is not present, to produce a blocked polyisocyanate compound and then adding the polyhydroxy compound (a) so that the isocyanate equivalents of the compound (b) become about one equivalent larger than the total of the hydroxyl group equivalents and the active hydrogen equivalents of the compound (a) and the compound (c), to conduct a reaction until substantially no hydroxyl group is detected, whereby a polyurethane compound (A-1) can be produced.

In the above reaction, it is possible to use, as necessary, a known catalyst used for urethane synthesis, such as tertiary amine (e.g. triethylamine), organometallic compound (e.g. dibutyltin dilaurate) or the like.

The thus-obtained polyurethane compound (A-1) has one terminal isocyanate in the molecule, and desirably has a number-average molecular weight of 400–10,000, preferably 700–7,000, more preferably 1,000–4,000. When the number-average molecular weight is less than 400, the resulting cationic electrodepositable coating composition gives a coating film of low flexibility and, when the molecular weight is more than 10,000, the coating film has inferior smoothness. Therefore, such molecular weights are generally not desirable.

The bisphenol type epoxy resin (A-2) is a bisphenol type compound having at least two epoxy groups in the molecule. Particularly preferable as the epoxy resin (A-2) is a diglycidyl ether of a bisphenol type compound, obtained by a condensation reaction between bisphenol type compound and epihalohydrin (e.g. epichlorohydrin), because it can easily give a coating film of excellent flexibility and corrosion resistance.

Typical examples of the bisphenol type compound usable in preparation of the epoxy resin (A-2) are compounds represented by the following general formula

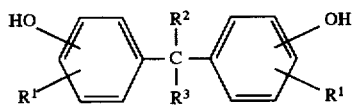

(wherein $R^1$, $R^2$ and $R^3$ are each a hydrogen atom or an alkyl group); and specific examples thereof are bis(4-hydroxyphenyl)-2,2-propane, bis(4-hydroxyphenyl)-1,1-ethane, bis(4-hydroxyphenyl)methane, 4,4'-dihydroxydiphenyl ether, 4,4'-dihydroxydiphenylsulfone, bis(4-hydroxphenyl)-1,1-isobutane and bis(4-hydroxy-3-tertbutylphenyl)-2,2-propane.

The bisphenol type epoxy resin (A-2) is particularly preferably a diglycidyl ether of bisphenol A, represented by the following formula

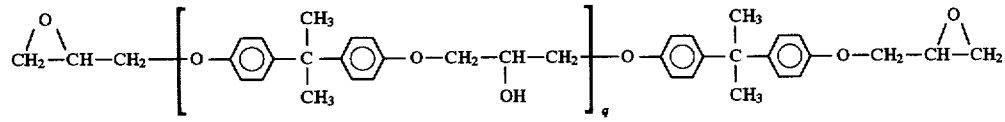

(wherein q is an integer of 2–20), because it can give a coating film of excellent flexibility and corrosion resistance.

As the epoxy resin (A-2) usable preferably, there can also be used a compound obtained by subjecting a bisphenol type compound and an epihalohydrin to a condensation reaction to obtain a diglycidyl ether of bisphenol and then subjecting an excess amount of said ether and said bisphenol type compound to an etherification reaction.

The epoxy resin (A-2) used in the present invention, preferably has a number-average molecular weight of generally about 310–10,000, particularly about 320–5,000, more particularly about 320–2,000 and an epoxy equivalents of about 155–5,000, particularly about 150–2,500, more particularly about 160–1,000.

The active-hydrogen-containing amino compound (A-3) is an amino compound having an active hydrogen atom(s) reactive with an epoxy group(s), and includes a primary or secondary amine of aliphatic type, alicyclic type or aromatic-aliphatic type, an alkanolamine, modification products thereof, a tertiary amine salt, etc. Examples of these active-hydrogen-containing amine compounds are as follows.

(1) Compounds obtained by reacting the primary amino group of an amine compound containing one secondary amino group and one or more primary amino group (examples of said amine compound are a polyalkylenepolyamine (e.g. diethyltriamine), a hydroxyalkylaminoalkylamine (e.g. hydroxyethylaminoethylamine) and an alkylaminoalkylamine (e.g. ethylaminoethyl amine or methylaminopropylamine), with a ketone (e.g. acetone or methyl ethyl ketone), an aldehyde (e.g. acetaldehyde or propionaldehyde) or a carboxylic acid (e.g. acetic acid or propionic acid) at a temperature of, for example, 100°–230° C. to convert into an aldimine, a ketimine, oxazoline or imidazoline.

(2) Secondary monoamines such as dialkylamine (e.g. diethylamine), dialkanolamine (e.g. diethanolamine or di-n- or iso-propanolamine), N-alkyl alkanolamine (e.g. N-methylethanolamine or N-ethylethanolamine) and the like.

(3) Secondary-amino-group-containing compounds obtained as an adduct by subjecting a monoalkanolamine (e.g. monoethanolamine) and a dialkyl(meth) acrylamide [e.g. dimethyl(meth)acrylamide] to a Micheal addition reaction.

(4) Compounds obtained by converting the primary amino group of an alkanolamine [e.g. monoethanolamine, neopentanolamine, 2-aminopropanol, 3-aminopropanol or 2-hydroxy-2'-(aminopropoxy)ethyl ether] into a ketimine.

(5) Salts between (a) tertiary amine such as dialkylalkanolamine (e.g. dimethylethanolamine), trialkylamine (e.g. triethylamine, trimethylamine or triisopropylamine), alkyldialkanolamine (e.g. methyldiethanolamine) or the like and (b) organic acid such as acetic acid, lactic acid or the like.

Of these compounds, those belonging to the groups (1), (2) and (4) are preferable. Particularly preferable are diethanolamine and a ketimine of diethylenetriamine because their secondary amino groups can have an active hydrogen group even after the reaction with epoxy group or by the hydrolysis of ketimine and thus can have a crosslinkable functional group.

The polyurethane-modified epoxy resin-amine adduct (A) can be produced, for example, by reacting the polyurethane compound (A-1) with the bis-phenol type epoxy resin (A-2) to obtain a polyurethane-modified epoxy resin and then adding the active-hydrogen-containing amine compound (A-3) to the polyurethane-modified epoxy resin.

In specifically producing the polyurethane-modified epoxy resin-amine adduct (A), it is particularly preferable in view of the designing and controlling of said adduct obtained, for example, to react the secondary hydroxyl group of the bisphenol type epoxy resin (A-2) with the polyurethane compound (A-1) to obtain a polyurethane-modified epoxy resin and then adding the active-hydrogen-containing compound (A-3) to the terminal oxirane group of the polyurethane-modified epoxy resin. Incidentally, the addition of the active-hydrogen-containing compound (A-3) may be conducted simultaneously with the production of the polyurethane-modified epoxy resin. The reaction between the active-hydrogen-containing amino compound (A-3) and the epoxy group of the epoxy resin (A-2) can be conducted, for example, at a temperature of about 30°–160° C. for about 1–5 hours.

The proportions of the polyurethane compound (A-1), the epoxy resin (A-2) and the active-hydrogen-containing amino compound (A-3) used in the reaction can be varied over a wide range depending upon the application of the resulting resin. Preferably, the amount of the polyurethane compound (A-1) used is generally 16–80% by weight, particularly 30–70% by weight, more particularly 50–70% by weight based on the total amount of the three components (A-1), (A-2) and (A-3); the amount of the epoxy resin (A-2) used is generally 20–84% by weight, particularly 25–70% by weight, more particularly 30–50% by weight on the same basis; and the active-hydrogen-containing amino compound (A-3) is used in such an amount that the resulting polyurethane-modified epoxy resin-amine adduct (A) has an amine value of 15–100, particularly 15–70, more particularly 15–47.

Preferably, the polyurethane-modified epoxy resin-amine adduct (A) formed has a number-average molecular weight of generally 1,000–20,000, particularly 1,000–10,000, more particularly 2,400–4,000.

Also preferably, the polyurethane-modified epoxy resin-amine adduct (A) has a primary hydroxyl group(s). There is no particular restriction as to the equivalents of the primary hydroxyl group(s), but the preferable equivalents are generally 600–1,000, particularly 600–850, more particularly 600–800. In said adduct, the primary hydroxyl group(s) brought about by the active-hydrogen-containing amino compound (A-3), etc. and the secondary hydroxyl group(s) present in the epoxy resin (A-2) serve as functional groups reactive with a crosslinking agent.

It is possible to react the polyurethane-modified epoxy resin-amine adduct (A) with a reagent such as tertiary amine salt, monocarboxylic acid, secondary sulfide salt, monophenol, monoalcohol or the like, to allow said adduct to have controlled water dispersi- bility or give a coating film having improved smoothness.

It is also possible to introduce, into the polyurethane-modified epoxy resin-amine adduct (A), a crosslinkable functional group such as blocked isocyanate group, β-hydroxycarbamic acid ester group, α,β-unsaturated carbonyl group, N-methylol group or the like, to allow said adduct to have higher internal crosslinkability.

The reaction with a reagent and the introduction of a crosslinkable functional group, both mentioned above may be conducted prior to the addition of the active-hydrogen-containing amino compound (A-3) to the polyurethane-modified epoxy resin.

The polyurethane-modified epoxy resin-amine adduct (A) can be used in combination with an external crosslinking agent. Such an external crosslinking agent includes compounds having, in the molecule, two or more crosslinkable functional groups, such as blocked polyisocyanate, β-hydroxycarbamic acid ester of polyamine, malonic acid ester, malonic acid ester derivative, methylolmelamine, methylolurea and the like. The ratio (in terms of solid content ratio) of the polyurethane-modified epoxy resin-amine adduct (A) and the external crosslinking agent is not strictly restricted but is preferably 100/0 to 60/40, particularly preferably 85/15 to 75/25.

The non-ionic film-forming resin (the resin (B)) used in combination with the above-mentioned polyurethane-modified epoxy resin-amine adduct (the resin (A)) contains substantially no functional group (e.g. carboxyl group or amino group) capable of forming an ionic group (a cationic or anionic group) when neutralized with an acid or a base, and is per se a thermoplastic resin capable of forming a continuous film under the baking conditions for electrodeposited coating film. The resin (B) may contain, as necessary, a functional group (e.g. a hydroxyl or epoxy group) reactive with an external crosslinking agent (which is described later).

The resin (B) has a number-average molecular weight of generally about 3,000–100,000, preferably about 3,500–70,000, more preferably about 4,000–50,000, and desirably has, in the molecule, a nonionic functional group (e.g. a hydroxyl group) crosslinkable with the blocked isocyanate group of the resin (A) or with an external curing agent during baking and curing.

Preferable examples of the resin (B) having the above-mentioned properties are an acrylic resin, a polyester resin, a polyester-modified acrylic resin, an acrylic resin-modified polyester resin and a silicone-modified resin.

Preferable examples of the resin (B) are specifically described below.

The nonionic acrylic resin includes acrylic resins obtained by using, as a main monomer, at least one acrylic monomer selected from alkyl (meth)acrylates [e.g. methyl (meth)acrylate, ethyl (meth)acrylate, butyl (meth)acrylate, propyl (meth)acrylate and 2-ethylhexyl (meth)acrylate], hydroxyalkyl (meth)acrylates [e.g. hydroxyethyl (meth)acrylate and hydroxypropyl (meth)-acrylate], glycidyl (meth)acrylate, etc. and, as other unsaturated monomer, at least one compound appropriately selected from vinyl aromatic compounds (e.g. styrene and α-methylstyrene), (meth)acrylonitrile, (meth)acrylamide, olefins (e.g. ethylene and propylene), dienes (e.g. butadiene and isoprene), vinyl acetate, etc. so as to satisfy the properties required for the resin to be obtained, and (co)polymerizing the main monomer and the other unsaturated monomer according to an ordinary process.

The acrylic resin desirably contains the units derived from the at least one acrylic monomer, in an amount of 25% by weight or more, particularly 35% by weight or more, more particularly 50% by weight or more. Also, the acrylic resin has an appropriate number-average molecular weight of about 3,000–100,000, preferably about 3,500–70,000, more preferably about 4,000–50,000. The acrylic resin, when containing a hydroxyl group(s) as a functional group, can react with the blocked isocyanate group in the resin (A) or with a blocked polyisocyanate compound (an external crosslinking agent) and can be crosslinked and cured.

The nonionic polyester resin used as the resin (B) includes, for example, a polyester resin having no terminal carboxyl group, which can be produced by subjecting, to polycondensation by an ordinary process, (1) a polybasic acid component such as phthalic acid or its anhydride, isophthalic acid, terephthalic acid, trimellitic acid or its anhydride, pyromellitic acid or its anhydride, hexahydrophthalic acid or its anhydride, succinic acid, adipic acid, pimelic acid, sebacic acid, brassylic acid or the like and (2) a polyol component such as ethylene glycol, diethylene glycol, propylene glycol, neopentyl glycol, 1,6-hexanediol, trimethylolpropane, glycerine, pentaerythritol, tricyclodecanedimethanol or the like. In the production, it is possible to use, for example, benzoic acid or p-tert-butylbenzoic acid as a terminal-blocking agent to control the molecular weight of the resulting polyester resin.

The polyester resin can have a number-average molecular weight of generally 3,000–100,000, preferably 3,500–70,000, more preferably 4,000–50,000.

The resin (B) may be a blend of the acrylic resin and the polyester resin. Or, the resin (B) may be a polyester-modified nonionic acrylic resin obtained by modifying (grafting) the acrylic resin with a polyester, or an acrylic resin-modified nonionic polyester resin obtained by modifying (grafting) the polyester resin with an acrylic resin.

The nonionic silicone-modified resin usable as the resin (B) includes a resin obtained by modifying an appropriate base resin (e.g. the above-mentioned acrylic resin or polyester resin, or an alkyd resin) with a silicone resin. The appropriate amount of the silicone resin used is generally 50% by weight or less, preferably 3–45% by weight, more preferably 3–30% by weight based on the total resin (the resin (B)).

The silicone resin used for modification of the base resin is generally an organopolysiloxane resin having a number-average molecular weight of about 500–2,000 and having, in the molecule, at least two reactive groups (e.g. hydroxyl groups or alkoxyl groups). The commercial products of such a silicone resin are, for example, Z-6018 (molecular weight= 1,600), Z-6188 (molecular weight=650), Sylkyd 50 and DC-3037 (these are products of Dow Corning Co.); KR-216, KR-218 and KSP-1 (these are products of Shin-Etsu Chemical Co., Ltd.); TSK-160 ad TSR-165 (these are products of Toshiba Corporation); and SH 5050, SH 6018 and SH 6188 (these are products of Dow Corning Toray Silicone Co., Ltd.).

The silicone-modified resin can be produced by subjecting the silicone resin and the base resin (e.g. an acrylic resin or a polyester resin) having a hydroxyl group(s) and/or a carboxyl group(s) to cocondensation in the proportions mentioned above, by a per se known process.

Of the above-mentioned various resins (B), the polyester-modified nonionic acrylic resin in which the amount of polyester grafted is 5–80% by weight, preferably 5–40% by weight based on the total resin, is particularly preferable because the resin has good compatibility with the polyurethane-modified epoxy resin-amine adduct and it is easy to introduce a crosslinkable functional group into the resin.

The (clear) cationic electrodepositable coating composition containing substantially no pigment, used in the step (1) according to the present invention can be prepared by dissolving or dispersing the resin (A) and the resin (B) in an aqueous medium by a per se known method.

The composition can be prepared, for example, by (1) a method of dissolving the resin (A) and the resin (B) in an organic solvent miscible with water, mixing the solution with water and an acid (a water-soluble organic or inorganic acid such as acetic acid, formic acid, lactic acid, phosphoric acid, sulfuric acid or the like) to conduct neutralization and form an aqueous bath, or (2) a method of dispersing the resin (A) in an aqueous medium, neutralizing the dispersion with an acid such as mentioned above to form an aqueous bath, and dispersing, in the aqueous bath, a solution of the resin (B) in an organic solvent miscible with water, forcibly by the use of a homogenizer. In the composition obtained by any of the above methods (1) and (2), the particles of the resin (B) are dispersed in water very stably by the acid neutralization product of the resin (A), whereby the composition can have excellent storage stability over a long period of time. The amount of the acid used for formation of aqueous bath cannot be specified strictly, but a preferable amount is generally about 5–40 KOH mg, particularly 10–20 KOH mg per g of resin solid in view of the electrodepositability of the resulting composition.

In the preparation of the clear cationic electrodepositable coating composition used in the step (1), the resin (A) and the resin (B) can each be used singly or in combination of two or more resins. The proportions of the resin (A) and the resin (B) compounded can be varied depending upon, for example, the kinds of respective resins and the properties required for the resulting electrodepositable coating composition, but the weight ratio of the resin (A)/the resin (B) can be generally 15/85 to 95/5, preferably 30/70 to 90/10, more preferably 50/50 to 80/20.

The clear cationic electrodepositable coating composition used in the step (1) can comprise as necessary, besides the resin (A) and the resin (B), various additives ordinarily used in coating industry, such as coloring pigment, corrosion-resistant pigment, extender pigment, inhibitor (corrosion suppressant), curing catalyst, surfactant and other additives. The present composition furthermore comprise, as an external crosslinking agent, a compound having two or more crosslinkable functional groups in the molecule, such as blocked polyisocyanate, β-hydroxycarbamic acid ester of polyamine, malonic acid ester, malonic acid ester derivative, methylolmelamine, methylolurea or the like. The desirable amount of the external crosslinking agent added is generally 100/0 to 60/40, preferably 90/10 to 65/35, more preferably 85/15 to 75/25 in terms of the weight ratio of (the resin (A)+the resin (B))/the external crosslinking agent.

The method and apparatus used for applying the present electrodepositable coating composition to a material to be coated, can be a method and an apparatus both used conventionally in cationic electrodeposition. In this case, it is preferable that the material to be coated is used as a cathode and stainless steel or a carbon plate is used as an anode. There is no particular restriction as to the electrodeposition conditions used, but it is generally desirable to conduct electrodeposition with stirring under the following conditions.

Bath temperature: 20°–30° C.

Voltage: 100–400 V (preferably 200–300 V)

Current density: 0.01–3 A/dm$^2$ (preferably, 0.05–2 A/dm$^2$)

Electrodeposition time: 1–5 minutes

Anode-to-cathode areal ratio: 2/1 to 1/2

Distance between electrodes: 10–100 cm

The coating film formed on the material to be coated (the cathode) is washed and then baked and cured generally at about 140°–180° C. for about 5–60 minutes.

The film of the clear cationic electrodepositable coating can have a thickness of generally 5–40 μm, preferably 10–30 μm after cure.

Step (2)

In this step, the aqueous coating composition containing a metallic pigment and/or a coloring pigment is applied as a first top coat on the cured film of the clear cationic electrodepositable coating formed in the step (1).

The aqueous coating composition is a thermosetting coating composition comprising a basic resin, a curing agent, a metallic pigment and/or a coloring pigment, water (these are main components) and, as necessary, an organic solvent, etc.

The basic resin is a main component of the coating film formed by a first top coat and is preferably a resin used for coatings, which has good weathering resistance and which can be made water-soluble or water-dispersible. It includes, for example, a resin which uses, as a base, an acrylic resin, a polyester resin, an epoxy resin, a urethane resin or the like (these are ordinarily used as a vehicle for aqueous coating composition) and which can be made water-soluble or water-dispersible. Said resin, which can be made water-soluble or water-dispersible, basically contains a hydrophilic group [e.g. carboxyl group (—COOH), hydroxyl group (—OH), methylol group (—CH$_2$OH), amino group (—NH$_2$), sulfone group (—SO$_3$H), or polyoxyethylene bond (CH$_2$CH$_2$O)$_n$] in an amount sufficient for the resin to become water-soluble or water-dispersible. Said resin is most typically a carboxyl group-containing resin which can be made water-soluble or water-dispersible by neutralization and subsequent formation of an alkali salt. The amount of the carboxyl group required for dissolution in water or dispersion in water varies depending upon the skeleton of resin, the content of other hydrophilic group, the kind of neutralizing agent and the neutralization equivalents, but the acid value is required to be 30 or more generally. The carboxyl group-containing resin can be made water-soluble or water-dispersible generally by neutralizing with an alkaline substance such as sodium hydroxide, an amine or the like.

The acrylic resin includes, for example, those having an acid value of about 30–100, particularly 35–90 and a hydroxyl value of about 20–200, particularly 30–150, obtained by copolymerizing an α,β-ethylenically unsaturated carboxylic acid, a (meth)acrylic acid ester having functional groups such as hydroxyl group, amido group, methylol group and the like, other (meth)acrylic acid ester, styrene, etc.

The polyester resin includes those obtained by subjecting a polybasic acid, a polyhydric alcohol and a modified glyceride(s) to a condensation reaction by an ordinary method. The epoxy resin includes epoxyester resins obtained, for example, by (1) a method which comprises reacting an epoxy compound with an unsaturated fatty acid to synthesize an unsaturated epoxy ester and adding an α,β-unsaturated acid to the unsaturated group of said ester or (2) a method which comprises esterifying the hydroxyl group of an epoxy ester with a polybasic acid such as phthalic acid or trimellitic acid.

The urethane resin includes polymers obtained by reacting the above-mentioned acrylic resin or polyester resin or epoxy resin with a diisocyanate compound.

The dispersion in water, of the basic resin can also be conducted by emulsion-polymerizing the monomer components used for production of the basic resin, in the presence of a surfactant or a water-soluble resin, or by dispersing the basic resin in water in the presence of, for example, an emulsifier. In this dispersion in water, the basic resin need not contain any of the above-mentioned hydrophilic groups or can contain said hydrophilic group in an amount smaller than that of the water-soluble resin.

As the aqueous dispersion of the acrylic resin, there is preferred an aqueous dispersion of an acrylic (co)polymer having an average particle diameter of about 0.05–1 μm, which dispersion is prepared by polymerizing an acrylic monomer and, as necessary, other copolymerizable monomer in the presence of a known dispersion stabilizer such as nonionic surfactant (e.g. polyoxyethylene nonyl phenyl ether), anionic surfactant (e.g. salt of polyoxyethylene alkyl aryl ether sulfate) or water-soluble resin (e.g. acrylic resin having an acid value of about 20–150, particularly 30–100 and a number-average molecular weight of about 5,000–30,000, particularly 5,000–20,000).

Examples of the monomers used in the above polymerization are α,β-ethylenically unsaturated carboxylic acids such as (meth)acrylic acid, maleic acid, fumaric acid, itaconic acid, half-esterified products of maleic acid or fumaric acid and the like; (meth)acrylic acid esters such as methyl (meth)acrylate, ethyl (meth)acrylate, propyl (meth)acrylate, butyl (meth)acrylate, 2-ethylhexyl (meth)acrylate and the like; hydroxyl group-containing (meth)acrylic acid esters such as hydroxyethyl (meth)acrylate, hydroxypropyl (meth) acrylate and the like; and other polymerizable unsaturated monomers such as N-propoxymethyl(meth)acrylamide, N-butoxymethyl(meth)acrylamide, glycidyl (meth)acrylate, styrene, vinyl acetate and the like.

The above polymerizable unsaturated monomers may be used, as necessary, together with a small amount of a polyfunctional unsaturated monomer such as ethylene glycol di(meth)acrylate, 1,6-hexanediol di(meth)acrylate, trimethylolpropane di(meth)acrylate, trimethylolpropane tri(meth)acrylate or the like.

The above aqueous dispersion is preferably one obtained by multistage polymerization. That is, first, a monomer containing no α,β-ethylenically unsaturated acid or a monomer mixture containing a small amount (preferably 5% by weight or less of the total monomers) of said acid is polymerized (copolymerized); then, a monomer mixture containing a large amount (preferably 5–30% by weight of the total monomers) of said acid is copolymerized; thus, a multistage polymerization emulsion is obtained. This multistage polymerization emulsion is preferable in view of the coating operation because the emulsion is thickened by neutralization with a neutralizing agent. The neutralizing agent usable includes ammonia, or a water-soluble amino compound such as monoethanolamine, diethanolamine, ethylamine, dimethylamine, diethylamine, triethylamine, propylamine, dipropylamine, isopropylamine, diisopropylamine, triethanolamine, butylamine, 2-ethylhexylamine, ethylenediamine, propylenediamine, methylethanolamine, dimethylethanolamine, diethylethanolamine, morpholine or the like. Of these, triethylamine and dimethylethanolamine (both are tertiary amines) are particularly preferable. Also, an acrylic resin of high acid value or a resin thickened with a thickener is also useful for the object of the present invention.

It is advantageous that the acrylic resin present in the aqueous dispersion is subjected to internal crosslinking in view of the mechanical stability and storage stability of said dispersion. Further, this aqueous dispersion of the acrylic resin may also contain, as necessary, water-dispersible resins of polyester type and polyurethane type produced by known processes.

The curing agent used in the aqueous coating composition acts to thermally and three-dimensionally crosslink and cure the basic resin also used in said coating composition. Preferable examples of the curing agent are amino resins obtained by (co)condensing melamine, benzoguanamine, urea or the like with formaldehyde, or further etherifying the reaction product with a lower monohydric alcohol.

The metallic pigment usable in the aqueous coating composition includes, for example, metal flakes such as aluminum flake, copper flake, bronze flake and the like. The coloring pigment includes, for example, inorganic pigments such as titanium dioxide, iron oxide, chromium oxide, lead chromate, carbon black and the like; and organic pigments such as Phthalocyanine Blue, Phthalocyanine Green, Carbazole Violet, Anthrapyrimidine Yellow, Flavanthrone Yellow, Isoindoline Yellow, Indanthrene Blue, Quinacridone Violet and the like. The metallic pigment and the coloring pigment can be used each singly or in combination of the two pigments. It is possible to further add an extender pigment such as talc, kaolin or the like.

The proportions of the individual components in the aqueous coating composition used in the step (2) can be appropriately selected depending upon the purpose of said coating composition. For example, however, the basic resin and the curing agent are preferably used so that the former is 60–90% by weight, particularly 70–85% by weight and the latter is 40-10% by weight, particularly 30-15% by weight based on the total weight of said two components; and the pigments can be used so as to give desired metallic feeling, a desired color, etc. and are appropriately added in the range of generally about 1–250 parts by weight, particularly about 5–200 parts by weight per 100 parts by weight of the total resin (solid) content of the basic resin and the curing agent.

The aqueous coating composition can be obtained by mixing the basic resin, the curing agent and the pigments with deionized water and, as necessary, additives such as organic solvent, thickening agent, defoaming agent and the like by an ordinary method and controlling the solid content to about 10–40% by weight and the viscosity to about 800–5,000 cps/6 rpm (Brookfield viscometer).

The aqueous coating composition can be used very suitably as a first base coat in the two-coat two-bake or two-coat one-bake application. The aqueous coating can be applied on the cured film of the clear cationic electrodepositable coating composition formed in the step (1), by spray coating or the like so as to give a cured film thickness of, for example, about 10–50 μm, particularly 15–40 μm. The curing of the aqueous coating film formed can be conducted, in the case of two-coat two-bake application, by heating the film to its curing temperature, for example, about 120°–170° C. generally for about 5–60 minutes.

Step (3)

The step (3) comprises applying, as a second top coat, an organic solvent type high-solid-content coating composition comprising substantially no pigment, on the cured film (the first aspect of the present invention) or uncured film (the second aspect of the present invention) of the first top coat (the aqueous coating composition), formed in the above step (2).

The high-solid-content coating composition is a thermosetting organic solvent type high-solid-content coating composition which can be applied onto the cured or uncured film of the aqueous coating composition, formed in the step (2). The high-solid-content coating composition can basically form a transparent coating film through which the metallic or colored coating film formed in the step (2) can be seen, and comprises:

(C) a carboxyl group-containing compound, (D) a vinyl type polymer containing, in the molecule, an epoxy group, a hydroxyl group and a hydrolyzable alkoxysilyl group, (E) a reactive organopolysiloxane, and (F) crosslinked polymer fine particles but is substantially free from any pigment such as coloring pigment, metallic pigment or the like.

Description is made hereinafter on the components (C) to (F) contained in the high-solid-content coating composition.

Carboxyl Group-Containing Compound (C)

The carboxyl group-containing compound (C) used in the high-solid-content coating composition can have an acid value of generally 50–500 mg KOH/g, preferably 65–400 mg KOH/g, more preferably 80–300 mg KOH/g. It specifically includes the following compounds (C-1) to (C-3).

(C-1): A vinyl type polymer containing, in the molecule, a group obtained by half-esterifying an acid anhydride group.

The group obtained by half-esterifying an acid anhydride group refers to a group consisting of a carboxyl group and a carboxylic acid ester group, obtained by adding an aliphatic monohydric alcohol to an acid anhydride group to give rise to ring opening (half-esterification) (the group is hereinafter referred to simply as "half ester group", in some cases).

The compound (C-1) can be easily produced, for example, by copolymerizing a half ester group-containing vinyl monomer and other vinyl monomer according to an ordinary process, or by conducting similar copolymerization using an acid anhydride group-containing vinyl monomer in place of the half ester group-containing vinyl monomer and then half-esterifyng the acid anhydride group in the resulting copolymer.

The acid anhydride group-containing vinyl monomer includes, for example, maleic anhydride and itaconic anhydride. The half ester group-containing vinyl monomer includes compounds obtained by half-esterifying the acid anhydride group of the above acid anhydride group-containing vinyl monomer.

The aliphatic monohydric alcohol usable for the half esterification of the acid anhydride group includes low-molecular monohyric alcohols such as methanol, ethanol, isopropanol, tert-butanol, isobutanol, methyl cellosolve, ethyl cellosolve and the like. The half esterification can be conducted according to an ordinary method, for example, at a temperature of room temperature to about 80° C. using, as necessary, a tertiary amine catalyst.

The other vinyl monomer copolymerizable with the vinyl monomer having a half ester group or an acid anhydride group includes, for example, a hydroxyl group-containing vinyl monomer, a (meth)acrylic acid ester, a vinyl ether and an allyl ether, an olefin compound and a diene compound, a hydrocarbon ring-containing unsaturated monomer and a nitrogen-containing unsaturated monomer, examples of which are shown below.

Examples of the hydroxyl group-containing vinyl monomer are $C_{2-8}$ hydroxyalkyl esters of (meth)acrylic acid, such as 2-hydroxyethyl (meth)acrylate, 2-hydroxypropyl (meth)acrylate, 3-hydroxypropyl (meth)acrylate, hydroxybutyl (meth)acrylate and the like; monoesters between polyether polyol (e.g. polyethylene glycol, polypropylene glycol or polybutylene glycol) and unsaturated carboxylic acid [e.g. (meth)acrylic acid]; monoethers between polyether polyol (e.g. polyethylene glycol, polypropylene glycol or polybutylene glycol) and hydroxyl group-containing unsaturated monomer [e.g. 2-hydroxyethyl (meth)acrylate]; monoesters or diesters between acid anhydride group-containing unsaturated compound (e.g. maleic anhydride or itaconic anhydride) and glycol (e.g. ethylene glycol, 1,6-hexanediol or neopentyl glycol); hydroxyalkyl vinyl ethers such as hydroxyethyl vinyl ether and the like; unsaturated alcohols such as allyl alcohol and the like; adducts between α,β-unsaturated carboxylic acid and monoepoxy compound [e.g. Cardura E10 (trade name, a product of Shell Chemical K.K.) or α-olefin epoxide]; adducts between glycidyl (meth) acrylate and monobasic acid (e.g. acetic acid, propionic acid, p-tert-butylbenzoic acid or higher fatty acid); and adducts between the above-mentioned hydroxyl group-containing monomer and lactone (e.g. ε-caprolactone or γ-valerolactone).

Examples of the (meth)acrylic acid ester are $C_{1-24}$ alkyl or cycloalkyl esters of (meth)acrylic acid, such as methyl (meth)acrylate, ethyl (meth)acrylate, n-propyl (meth) acrylate, isopropyl (meth)acrylate, n-butyl (meth)acrylate, isobutyl (meth)acrylate, tert-butyl (meth)acrylate, hexyl (meth)acrylate, 2-ethylhexyl (meth)acrylate, n-octyl (meth) acrylate, decyl (meth)acrylate, stearyl (meth)acrylate, lauryl (meth)acrylate, cyclohexyl (meth)acrylate, and the like; and $C_{2-18}$ alkoxyalkyl esters of (meth)acrylic acid, such as methoxybutyl (meth)acrylate, methoxyethyl (meth)acrylate, ethoxybutyl (meth)acrylate, and the like.

Examples of the vinyl ether and the allyl ether are chainlike alkyl vinyl ethers such as ethyl vinyl ether, n-propyl vinyl ether, isopropyl vinyl ether, butyl vinyl ether, tert-butyl vinyl ether, pentyl vinyl ether, hexyl vinyl ether, octyl vinyl ether and the like; cycloalkyl vinyl ethers such as cyclopentyl vinyl ether, cyclohexyl vinyl ether and the like; aryl vinyl ethers such as phenyl vinyl ether, tolyl vinyl ether and the like; aralkyl vinyl ethers such as benzyl vinyl ether, phenethyl vinyl ether and the like; and allyl ethers such as allyl glycidyl ether, allyl ethyl ether and the like.

Examples of the olefin compound and the diene compound are ethylene, propylene, butylene, vinyl chloride, butadiene, isoprene and chloroprene.

Examples of the hydrocarbon ring-containing unsaturated monomer are styrene, α-methylstyrene, phenyl (meth) acrylate, phenylethyl (meth)acrylate, phenylpropyl (meth) acrylate, benzyl (meth)acrylate, phenoxyethyl (meth) acrylate, cyclohexyl (meth)acrylate, 2-acryloyloxyethyl hydrogenphthalate, 2-acryloyloxypropyl hydrogenphthalate, 2-acryloyloxypropyl hexahydrohydrogenphthalate, 2-acryloyloxypropyl tetrahydrohydrogenphthalate, an ester between p-tert-butylbenzoic acid and hydroxyethyl (meth)acrylate, and dicyclopentenyl (meth)acrylate.

Examples of the nitrogen-containing unsaturated monomer are mono- or di-alkylaminoalkyl (meth)acrylates such as N,N-dimethylaminoethyl (meth)acrylate, N,N-diethylaminoethyl (meth)acrylate, N-tert-butylaminoethyl (meth)acrylate, and the like; (meth)acrylamides such as acrylamide, methacrylamide, N-methyl(meth)acrylamide, N-ethyl(meth)acrylamide, N,N-dimethyl(meth)acrylamide, N,N-dimethylaminopropyl(meth)acrylamide, N,N-dimethylaminoethyl(meth)acrylamide and the like; vinyl aromatic nitrogen-containing compounds such as 2-vinylpyridine, 1-vinyl-2-pyrrolidone, 4-vinylpyridine and the like; polymerizable nitrites such as acrylonitrile, methacrylonitrile and the like; and allylamine.

The copolymerization between the half ester group- or acid anhydride group-containing vinyl monomer and the other vinyl monomer can be conducted by any ordinary process for vinyl monomer polymerization. However, a solution type radical polymerization process using an organic solvent is most suitable in view of the wide usability, cost, etc. For example, the vinyl monomers are copolymerized in the presence of a polymerization initiator (e.g. azobisisobutyronitrile or benzoyl peroxide) at a temperature of about 60°–150° C. in an organic solvent such as aromatic solvent (e.g. xylene or toluene), ketone type solvent (e.g. methyl ethyl ketone or methyl isobutyl ketone), ester type solvent (e.g. ethyl acetate, butyl acetate, isobutyl acetate or 3-methoxybutyl acetate), alcohol (e.g. n-butanol or isopropyl alcohol) or the like, whereby an intended polymer can be obtained easily.

The proportions of the half ester group- or acid anhydride group-containing vinyl monomer and the other vinyl monomer, used in their copolymerization can be varied in a wide range depending upon, for example, the desired properties of the coating film formed. However, it is appropriate that the half ester group- or acid anhydride group-containing vinyl monomer is used in an amount of generally 5–40% by weight, preferably 10–30% by weight based on the total amount of the monomers in view of the curability and storage stability and the other vinyl monomer is used in an amount of generally 60–95% by weight, preferably 70–90% by weight on the same basis. When the other vinyl monomer or part thereof is styrene, the amount of styrene used is appropriately about 20% by weight or less in view of the weatherability of the cured coating film obtained, etc.

The compound (C-1) is particularly preferably an acrylic polymer having a number-average molecular weight of 2,000–10,000, preferably 2,000–8,000, more preferably 2,000–6,000.

(C-2): A carboxyl group-containing polyester type polymer having a number-average molecular weight of 1,500–2,000

The carboxyl group-containing polyester type polymer can be easily obtained, for example, by a condensation reaction between a polyhydric alcohol (e.g. ethylene glycol, butylene glycol, 1,6-hexanediol, trimethylolpropane or pentaerythritol) and a poly-carboxylic acid (e.g. adipic acid, terephthalic acid, isophthalic acid, phthalic anhydride or hexahydrophthalic anhydride). For example, a carboxyl group-containing polyester type polymer can be obtained by a one- step reaction in an excess of carboxyl group (of polycarboxylic acid), or by first synthesizing a hydroxyl group-terminated polyester type polymer in an excess of hydroxyl group (of polyhydric alcohol) and then adding an acid anhydride group-containing compound (e.g. phthalic anhydride, hexahydrophthalic anhydride or succinic anhydride).

It is effective to introduce, into the carboxyl group-containing polyester type polymer, a hydroxyl group so as to give a hydroxyl value of 0–100 mg KOH/g, particularly 10–90 mg KOH/g, in order to improve the compatibility of the polymer with the vinyl type polymer (D) and the reactive organopolysiloxane (E) or to impart, to the polymer, reactivity with the hydrolyzable alkoxysilyl group of the vinyl type polymer (D). The introduction of hydroxyl group can be easily conducted by stopping the above-mentioned condensation reaction in an excess of carboxyl group (of polycarboxylic acid), or by synthesizing a hydroxyl group-terminated polyester type polymer in an excess of hydroxyl group (of polyhydric alcohol) and then adding an acid anhydride group-containing compound in an amount of less than the hydroxyl group of the above polyester type polymer.

(C-3): A relatively low-molecular half ester having a number-average molecular weight of ordinarily 400–1,000, obtained by an addition reaction between a polyol and a 1,2-acid anhydride The half ester can be obtained by reacting a polyol and a 1,2-acid anhydride under such conditions that a ring-opening reaction of the acid anhydride takes place but substantially no polyester is formed. The reactive product obtained generally has a low molecular weight and a narrow molecular weight distribution. It contains small amounts of volatile organic substances, and imparts excellent properties (e.g. high luster) to the coating film formed.

The reaction between the polyol and the 1,2-acid anhydride is conducted generally in a solvent in an inert atmosphere such as nitrogen or the like. Examples of the preferable solvent are ketones such as methyl amyl ketone, diisobutyl ketone, methyl isobutyl ketone and the like; aromatic hydrocarbons such as toluene, xylene and the like; dimethylformamide; and N-methylpyrrolidone.

The reaction temperature is preferably about 150° C. or less; specifically, it is ordinarily about 70°–150° C., preferably about 90°–120° C. The reaction time is ordinarily about 10 minutes to 24 hours although it can be varied basically depending upon the reaction temperature.

The equivalent ratio of the acid anhydride and the polyol is preferably about 0.8:1 to about 1.2:1, particularly about 1:1 when the acid anhydride is assumed to be monofunctional. With this ratio, a desired half ester can be obtained in the maximum amount.

The acid anhydride used in production of the half ester, preferably has about 2–30, particularly 2–20 carbon atoms when the carbon atoms of acid moiety are excluded. Examples of such an acid anhydride are aliphatic, alicyclic, olefinic or cyclic olefinic acid anhydrides and aromatic acid anhydrides. Substituted aliphatic or substituted aromatic acid anhydrides can be used unless the substituents thereof adversely affect the reactivity of acid anhydride or the properties of the half ester obtained from the acid anhydride. Examples of the substituents are halogen atoms, alkyl groups and alkoxy groups.

Specific examples of such an acid anhydride are succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydrides (e.g. methylhexahydrophthalic anhydride), tetrafluorophthalic anhydride, endomethylenetetrahydrophthalic anhydride, chlorendic anhydride, itaconic anhydride, citraconic anhydride and maleic anhydride.

The polyol usable in the reaction with the acid anhydride can have generally 2–20, particularly 2–10 carbon atoms and is preferably a diol, a triol or a mixture thereof. Examples of the polyol are preferably aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, 3-methyl-1,5-pentanediol, trimethylolpropane, 2,2,4-trimethylpentane-1,3-diol, pentaerythritol and 1,2,3,4-butanetetraol. It is possible to use an aromatic polyol such as bisphenol A, bis(hydroxymethyl)xylene or the like.

Of the above-mentioned carboxyl group-containing compounds (C), particularly preferable are the vinyl type polymer (C-1) and the half ester (C-3).

Vinyl Type Polymer (D) Containing, in the Molecule, an Epoxy Group, a Hydroxyl Group and a Hydrolyzable Alkoxysilyl Group The vinyl type polymer (D) used in the high-solid-content coating composition can be obtained, for example, by copolymerizing an epoxy group-containing vinyl monomer, a hydroxyl group-containing vinyl monomer, a hydrolyzable alkoxysilyl group-containing vinyl monomer and other vinyl monomer by an ordinary process similar to that mentioned for the compound (C-1).

Herein, "hydrolyzable alkoxysilyl group" includes hydrolyzable reactive silyl groups (functional groups) represented by the following general formula:

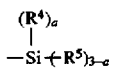

(wherein $R^4$ is a hydrogen atom, an alkyl group, an aryl group or an aralkyl group; $R^5$ is a halogen atom, an alkoxy group, an acyloxy group, a phenoxy group, an iminoxy group or an alkenyloxy group; and a is 0, 1 or 2), such as halosilyl group, alkoxysilyl group, acyloxysilyl group, phenoxysilyl group, iminoxysilyl group, alkenyloxysilyl group and the like.

The epoxy group-containing vinyl monomer used in the above copolymerization includes, for example, glycidyl (meth)acrylate and allyl glycidyl ether. As the hydroxyl group-containing vinyl monomer, there can be used, for example, those compounds mentioned with respect to the production of the compound (C-1). The hydrolyzable alkoxysilyl group-containing vinyl monomer includes, for example, vinyltrimethoxysilane, vinylmethyldimethoxysilane, vinyltriethoxysilane, vinylmethyldiethoxysilane, vinyltris(2-methoxyethoxy)silane, γ-(meth)acryloyloxypropyltrimethoxysilane, γ-(meth)acryloyloxypropylmethyldimethoxysilane, vinyltriacetoxysilane, β-(meth)acryloyloxyethyltrimethoxysilane, γ-(meth)acryloyloxypropyltriethoxysilane and γ-(meth)acryloyloxypropylmethyldiethoxysilane. Of these, preferable are those compounds whose hydrolyzable alkoxysilyl group is a triethoxysilyl group or a methyldiethoxysilyl group, such as vinyltriethoxysilane, vinylmethyldiethoxysilane, γ-(meth)acryloyloxypropyltriethoxysilane and γ-(meth)acryloyloxypropylmethyldiethoxysilane in view of the low-temperature curability and storage stability. As the other vinyl monomer, there can be used those compounds mentioned with respect to the production of the compound (C-1).

The proportions of the epoxy group-containing vinyl monomer, the hydroxyl group-containing vinyl monomer, the hydrolyzable alkoxysilyl group-containing vinyl monomer and the other vinyl monomer used in their copolymerization are as follows. The proportion of the epoxy group-containing monomer can be 5–60% by weight, preferably 10–40% by weight based on the total weight of the total monomers in view of the curability and storage stability of the high-solid-content coating composition obtained. The proportion of the hydroxyl group-containing vinyl monomer can be 3–50% by weight, preferably 5–30% by weight on the same basis in view of the curability and storage stability of the high-solid-content coating composition obtained. The proportion of the hydrolyzable alkoxysilyl group-containing vinyl monomer can be 3–40% by weight, preferably 5–20% by weight on the same basis in view of the curability and cost of the high-solid-content coating composition obtained. The proportion of the other vinyl monomer can be 10–80% by weight, preferably 20–50% by weight on the same basis. When the other vinyl monomer or part thereof is styrene, the amount of styrene used is appropriately about 20% by weight or less based on the total weight of the total monomers in view of the weatherability of the cured film obtained.

The vinyl type polymer (D) can generally have an epoxy group in an amount of 0.5–5 mM/g, preferably 0.6–3 mM/g, more preferably 0.8–2.5 mM/g, a hydroxyl group in an amount of 10–200 mg KOH/g, preferably 20–160 mg KOH/g, more preferably 30–120 mg KOH/g, and a hydrolyzable alkoxysilyl group in an amount of 0.3–5 mM/g, preferably 0.6–4 mM/g, more preferably 1.0–3 mM/g.

The vinyl type polymer (D) is particularly preferably an acrylic polymer having a number-average molecular weight of 2,000–10,000, particularly 2,000–8,000, more particularly 2,000–6,000.

Reactive Organopolysiloxane (E)

The reactive organopolysiloxane (E) used in the high-solid-content coating composition is a compound having a reactive functional group and an organic group at the side chain, terminal or both of the polysiloxane chain. The reactive organopolysiloxane is a component used for imparting high acid resistance and abrasion resistance to the coating film obtained with the high-solid-content coating composition; has no particular restriction as to its type as long as it is compatible with the compound (C) and the polymer (D); and can have any of linear, branched, net-like and ring-like structures.

The organic group includes, for example, hydrocarbon groups such as alkyl group, alkenyl group, aryl group and the like. A methyl group, a vinyl group, a phenyl group, etc. are preferable in practical application in view of the cost, etc.

The reactive functional group includes, for example, a silanol group, an alkoxysilyl group, an alcoholic hydroxyl group, a glycidyl group, an amino group, a mercapto group, a carboxyl group, an amido group, a vinyl group and a (meth)acryloxy group. Of these, an alkoxysilyl group, an alcohlic hydroxyl group and a glycidyl group are preferable.

The molecular weight of the reactive organopolysiloxane (E) can be appropriately determined in a range in which the polysiloxane has compatibility with the compound (C) and the polymer (D), and cannot be specified generally; however, it is appropriately in the range of generally 100–10,000, preferably 200–7,500, more preferably 300–5,000 in terms of number-average molecular weight.

The number of silicon atoms present in the molecule of the reactive organopolysiloxane (E) is not strictly restricted, but is preferably 2–300, particularly 2–100, more particularly 3–50.

As the reactive organopolysiloxane (E), there can be used a per se known compound. Specific examples thereof are those disclosed in Japanese Patent Application Kokai (Laid-Open) No. 43696/1993, Japanese Patent Application Kokai (Laid-Open) No. 70509/1995, etc. The reactive organopolysiloxane (E) can be used in a single compound or in combination of two or more compounds.

Crosslinked Polymer Fine Particles (F)

The crosslinked polymer fine particles (F) used in the high-solid-content coating composition is an internally crosslinked particulate polymer which has no compatibility with the carboxyl group-containing compound (C), the vinyl type polymer (D) containing, in the molecule, an epoxy group, a hydroxyl group and a hydrolyzable alkoxysilyl group, the reactive organopolysiloxane (E) or solvents but which is stably dispersible therein. The crosslinked polymer fine particles (F) are added to a mixture of the components (C), (D) and (E) to impart thixotropy thereto.

The mixture of the components (C), (D) and (E) shows substantially Newtonian flow; therefore, the mixture produces various coating film defects such as sagging, cissing and the like, for example, when the mixture is coated on the vertical side of a substrate or when the coated substrate is subjected to temperature elevation for baking. However, when the crosslinked polymer fine particles (F) are added to the mixture, the resulting material is substantially free from the above-mentioned coating film defects. That is, the material containing the component (F), although its apparent viscosity is large when allowed to stand, has a sufficiently low viscosity when a shear stress is applied thereto, for example, during spraying, enabling easy spraying operation without giving rise to sagging; moreover, already in several seconds to several minutes after coating on a substrate, the material containing the component (F) exhibits thixotropy and gives rise to no cissing or the like.

As the crosslinked polymer fine particles (F) having the above-mentioned effects, there can be used per se known intra-molecularly crosslinked polymer fine particles obtained by aqueous emulsion or aqueous suspension polymerization or non-aqueous dispersion polymerization. Of these, intra-molecularly crosslinked polymer fine particles obtained by aqueous emulsion or aqueous suspension polymerization can be separated in a solid form by a physical or chemical means such as vaporization or azeotropic distillation of water, precipitation or flocculation of polymer particles, or the like. In carrying out such a physical or chemical means, the medium for crosslinked polymer fine particles to be obtained may be changed directly from water to a resin, an organic solvent or the like.

As the crosslinked polymer fine particles (F), there can be preferably used those obtained, for example, by emulsion-polymerizing, according to the disclosure made in Japanese Patent Application Kokai (Laid-Open) No. 66770/1991 (=U.S. Pat. No. 5,348,998), a polymerizable monomer having, in the molecule, at least two radical-polymerizable unsaturated groups and other radical-polymerizable unsaturated monomer in the presence of a reactive emulsifier having an allyl group in the molecule. In this case, the resulting polymer fine particles are internally crosslinked by the polymerizable monomer having, in the molecule, at least two radical-polymerizable unsaturated groups.

As the crosslinked polymer fine particles (F), there can also be preferably used a non-aqueous dispersion of polymer fine particles insoluble in the organic solvent used as a polymerization solvent, obtained, for example, by polymerizing, according to the disclosure made in Japanese Patent Application Kokai (Laid-Open) No. 95116/1989 (=U.S. Pat. No. 5,198,503), a radical-polymerizable unsaturated monomer in an organic solvent in the presence of a polymer resin (acting as a dispersion stabilizer) containing, as an essential monomer component, an alkoxysilyl group-containing vinyl monomer. In this case, the resulting polymer fine particles are internally crosslinked by the alkoxysilyl group-containing vinyl monomer, and their internal crosslinking can be further enhanced by using, as part of the radical-polymerizable unsaturated monomer, a polymerizable monomer having, in the molecule, at least two radical-polymerizable unsaturated groups.

These crosslinked polymer fine particles have a high crosslink density; show substantially no swelling or no fusion-bonding even in a solvent having a high solvency for polymers, such as toluene, ethyl acetate or the like; moreover, when added to a binder resin solution or dispersion containing a solvent of high solvency, can give a high-solid-content solution or dispersion of high resin content without increasing the viscosity of the binder resin solution or dispersion. Further, such a composition containing the crosslinked polymer fine particles can form, after drying, a cured coating film of the polymer fine particles and the binder resin.

The crosslinked polymer fine particles (F) appropriately have an average particle diameter of generally 0.01–2 μm, preferably 0.03–1 μm, more preferably 0.05–0.5 μm.

In preparing, in the step (3), a high-solid-content coating composition from the above-mentioned components, i.e. the carboxyl group-containing compound (C), the vinyl type polymer (D) containing, in the molecule, an epoxy group, a hydroxyl group and a hydrolyzable alkoxysilyl group, the reactive organopolysiloxane (E) and the crosslinked polymer fine particles (F), these components are preferably used in the following proportions. That is, the compound (C) and the polymer (D) can be used in an equivalent ratio of the carboxyl group of the former and the epoxy group of the latter, of 1:0.5 to 0.5:1; the reactive organopolysiloxane (E) can be used in an amount of 3–50 parts by weight per 100 parts by weight of the total of the compound (C) and the polymer (D); and the crosslinked polymer fine particles (F) can be used in an amount of 1–20 parts by weight per 100 parts by weight of the total of the compound (C), the polymer (D) and the reactive organopolysiloxane (E).

More preferably, the compound (C) and the polymer (D) can be used in an equivalent ratio of the carboxyl group of the former and the epoxy group of the latter, of 1:0.6 to 0.6:1, particularly 1:0.8 to 0.8:1; the reactive organopolysiloxane (E) can be used in an amount of 4–40 parts by weight, particularly 5–30 parts by weight per 100 parts by weight of the total of the compound (C) and the polymer (D); and the crosslinked polymer fine particles (F) can be used in an amount of 1–15 parts by weight, particularly 1–10 parts by weight per 100 parts by weight of the total of the compound (C), the polymer (D) and the reactive organopolysiloxane (E).

The high-solid-content coating composition used in the step (3) may further comprise a curing catalyst as necessary. The curing catalyst includes a catalyst which is effective for the crosslinking of carboxyl group and epoxy group, such as quaternary salt (e.g. tetraethylammonium bromide, tetrabutylammonium bromide, tetraethylammonium chloride, tetrabutylphosphonium bromide or triphenylbenzylphosphonium chloride) or amine (e.g. triethylamine or tributylamine). Of these, a quaternary salt catalyst is preferable. A mixture of such a quaternary salt and about the same equivalent of a phosphate compound (e.g. monobutyl phosphate or dibutyl phosphate) is more preferable because the mixture, without impairing the catalytic activity of the quaternary salt, can improve the storage stability of the coating composition and can prevent the reduction in spray coatability of coating composition, caused by reduction in electrical resistance of coating composition.

The curing catalyst also includes a catalyst which is effective for the crosslinking of hydrolyzable alkoxysilyl group (e.g. triethoxysilyl group), such as tin compound (e.g. dibutyltin dilaurate or dibutyltin diacetate), titanium compound (e.g. tetrabutyl titanate) or amine (e.g. triethylamine or tributylamine).

The above two kinds of curing catalysts can be used singly or in combination thereof, but are desirably used in combination in view of the curability and abrasion resistance of the coating composition.

The high-solid-content coating composition used in the step (3) may further comprise, as necessary, a dehydrating agent such as trimethyl orthoacetate or the like in order to suppress the deterioration of the composition caused by the water present in the solvent used therein or in air.

The high-solid-content coating composition may furthermore comprise, as necessary, resins such as polyester resin, alkyd resin, silicone resin, fluororesin and the like. The coating composition may also comprise a small amount of a crosslinking agent such as melamine resin, blocked isocyanate or the like. The coating composition may also comprise, as necessary, ordinary additives for coatings, such as ultraviolet absorber, antioxidant, surface conditioner, defoaming agent and the like.

The high-solid-content coating composition is used ordinarily in the form of an organic solvent type coating composition. The organic solvent used therein may be an organic solvent used in coatings, such as aromatic or aliphatic hydrocarbon type solvent, alcohol type solvent, ester type solvent, ketone type solvent, ether type solvent or the like. The organic solvent used in the coating composition may be the solvent per se, used in the production of the polymer used in the composition, or may be further added as necessary. The solid content of the coating composition can be generally 40–80% by weight, preferably 50–75% by weight.

The high-solid-content coating composition can be applied onto the cured film of the aqueous coating composition, formed in the step (2) according to the first aspect of the present invention; or, can be applied onto the uncured film of the aqueous coating composition, formed in the step (2) according to the second aspect of the present invention by applying the aqueous coating composition and then simply air-drying the resulting film at a temperature from room temperature to 100° C. (substantially no heat-curing takes place) to remove nearly the whole portion of the water contained in the film. There is no particular restriction as to the method of application of the high-solid-content coating composition, and there can be used any ordinary application method such as air spray coating, airless spray coating, air spray electrostatic coating, airless spray electrostatic coating, rotary atomization electrostatic coating or the like.

There is no particular restriction, either, as to the thickness of the film of the high-solid-content coating composition, but an appropriate film thickness is generally about 10–80 μm, preferably 25–50 μm as cured.

The conditions for curing the film of the high-solid-content coating composition can be those under which the film of the coating composition can be cured; for example, when two-coat two-bake is employed according to the first aspect of the present invention, about 120°–170° C. and about 10–60 minutes can be adopted.

Step (4)

The curing temperature used for simultaneously curing, in the two-coat one-bake system, the first top coat film and the second top coat film formed with the aqueous coating composition and the high-solid-content coating composition in the step (2) and the step (3) according to the second aspect of the present invention, can be generally about 120°–170° C. at which the two coating films can be cured. The heating time for the simultaneous curing can be generally about 5–60 minutes. Thus, the two coating films can be cured simultaneously.

The above-mentioned coating method of the present invention is simple to apply, can give a coating film very superior in appearance, corrosion resistance, weathering resistance, chipping resistance, etc., and contributes to resource saving and reduced public hazard. Said method can be widely utilized in coating of automobiles, bicycles, electric appliances, etc.

The present invention is hereinafter described more specifically by way of Examples. In the following, % refers to % by weight.

[Preparation of Samples]

Production of Cationic Electrodepositable Coating Compositions

Production of Polyurethane-Modified Epoxy Resin-Amine Adduct (A)

Into a flask equipped with a stirrer, a thermometer, a nitrogen inlet tube and a reflux condenser were fed 666 g of isophorone diisocyanate (a product of Daicel-Hüls Ltd.), 269 g of methyl isobutyl ketone, 118 g of ethylene glycol monobutyl ether and 0.2 g of dibutyltin dilaurate. They were reacted in a nitrogen atmosphere at 70° C. until the isocyanate group concentration became 6.38 mM/g. Thereto was added 1,634 g of Placcel 208 (a polyester polyol obtained by ring opening of cyclic lactone, having OH equivalents of 409, a product of DAICEL CHEMICAL INDUSTRIES, LTD.), after which a reaction was conducted in a nitrogen atmosphere at 70° C. until the isocyanate group concentration became 0.414 mM/g to obtain a viscous urethane prepolymer solution.

Separately, into a flask equipped with a stirrer, a thermometer, a nitrogen inlet tube and a reflux condenser were fed 775 g of bisphenol A diglycidyl ether having epoxy equivalents of 190, 237 g of bisphenol A and 13.5 g of methylbenzylamine. They were reacted at 110° C. until the epoxy concentration became 1.85 mM/g, to obtain an epoxy resin having a number-average molecular weight of 1,025 and epoxy equivalents of 539.

To this epoxy resin was added 1,333 g of the urethane prepolymer solution obtained above. They were reacted in a nitrogen atmosphere at 90° C. until no isocyanate group remained. The reaction mixture was diluted with 378 g of ethylene glycol monobutyl ether, followed by addition of 200 g of diethanolamine. The mixture was subjected to a reaction at 90° C. until no epoxy group remained. The reaction mixture was diluted with ethylene glycol monobutyl ether to a solid content of 75% to obtain a polyurethane-modified epoxy resin-amine adduct solution (A) having primary hydroxyl group equivalents of 638 and an amine value of 46.3.

| Production of nonionic acrylic resin (B) | | |
|---|---|---|
| (1) | Butyl cellosolve | 26 parts |
| (2) | 80% polyester monomer (FM-3X, a product of DAICEL CHEMICAL INDUSTRIES, LTD.) | 37.5 parts |
| (3) | Styrene | 40 parts |
| (4) | Hydroxyethyl methacrylate | 25 parts |
| (5) | n-Butyl methacrylate | 5 parts |
| (6) | AIBN (azobisisobutyronitrile) | 4 parts |
| (7) | Butyl cellosolve | 5 parts |
| (8) | Azobisdimethylvaleronitrile | 0.5 part |
| (9) | Cellosolve | 23 parts |

The component (1) was heated to 130° C. Thereto were dropwise added the components (2) to (6) at 130° C. in 5 hours. The mixture was kept at 130° C. for 2 hours. Thereto were dropwise added the components (7) and (8) at 130° C. in 2 hours. The mixture was kept at 130° C. for 2 hours. Then, the component (9) was added, followed by cooling, whereby was obtained an acrylic resin solution (B) having a solid content of 62% and a number-average molecular weight of about 5,000.

Production of Clear Cationic Electrodepositable Coating Composition (I-a)

52 g (as solid content) of the resin (A), 23 g (as solid content) of the resin (B) (both obtained above) and 25 g (as solid content) of methyl ethyl ketoxime-blocked isophorone diisocyanate (a crosslinking agent) were compounded. Thereto were added 1 g of a polypropylene glycol (SANNIX PP4000, a product of Sanyo Chemical Industries, Ltd.), 0.82 g of formic acid and 1 g of lead acetate (all the amounts are per 100 g of the solid content of the above-compounded resin composition). To the mixture was gradually added deionized water with stirring at 40° C., to give rise to dispersion to obtain a stable emulsion having a resin solid content of 30%. To the emulsion were added 3 g of basic lead silicate, 2 g of dibutyltin oxide and 1 g of a nonionic surfactant [Noigen EA-142B (trade name), a product of Daiichi Kogyo Seiyaku Co., Ltd.] (all the amounts are per 100 g of the resin solid content of the emulsion). The mixture was subjected to dispersion of components by the use of a ball mill until the particle sizes became 10μ or smaller, followed by dilution with deionized water until the resin solid content became 15%. Thus, a clear cationic electrodepositable coating composition (I-a) was obtained.

Production of Cationic Electrodepositable Coating Composition (I-b) for Comparison 52 g (as solid content) of the resin (A), 23 g (as solid content) of the resin (B) (both obtained above) and 25 g (as solid content) of methyl ethyl ketoxime-blocked isophorone diisocyanate (a crosslinking agent) were compounded. Thereto were added 1 g of a polypropylene glycol (SANNIX PP4000, a product of Sanyo Chemical Industries, Ltd.), 0.82 g of formic acid and 1 g of lead acetate (all the amounts are per 100 g of the solid content of the above-compounded resin composition). To the mixture was gradually added deionized water with stirring at 40° C., to give rise to dispersion to obtain a stable emulsion having a resin solid content of 30%. To the emulsion were added 3 g of basic lead silicate, 13 g of titanium dioxide, 0.3 g of carbon, 3 g of clay, 2 g of dibutyltin oxide and 1 g of a nonionic surfactant [Noigen EA-142B (trade name), a product of Daiichi Kogyo Seiyaku Co., Ltd.] (all the amounts are per 100 g of the resin solid content of the emulsion). The mixture was subjected to dispersion of components by the use of a ball mill until the particle sizes became 10μ or smaller, followed by dilution with deionized water until the resin solid content became 15%. Thus, a cationic electrodepositable coating composition (I-b) for comparison was obtained.

Production of Aqueous Coating Compositions (M-1) and (S-1)

Production of Acrylic Resin Aqueous Dispersion (W-1)

In a reactor were fed 140 parts of deionized water, 2.5 parts of 30% Newcol 707SF (see Note 1 below) and 1 part of the following monomer mixture (1). They were stirred in a nitrogen atmosphere. Thereto was added, at 60° C. in 4 hours by the use of a metering pump, a monomer emulsion consisting of 79 parts of the following monomer mixture (1), 4 parts of 3% ammonium persulfate and 42 parts of deionized water. Then, aging was conducted for 1 hour.

To the reactor were fed 20.5 parts of the following monomer mixture (2) and 4 parts of 3% ammonium persulfate simultaneously but in parallel at 80° C. in 1.5 hours. Then, aging was conducted for 1 hour. Thereafter, filtration through 200-mesh nylon cloth was conducted at 30° C. To the filtrate was added deionized water, and the mixture was adjusted to pH 7.5 with dimethylaminoethanol to obtain an acrylic resin aqueous dispersion (W-1) having an average particle diameter of 0.1μ, a glass transition temperature (Tg) of 46° C. and a non-volatile content of 20%.

| Monomer mixture (1) | |
|---|---|
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |
| Methacrylic acid | 3 parts |
| 30% Newcol 707SF (Note 1) | 0.5 part |

(Note 1: 30% Newcol 707SF is a surfactant produced by Nippon Nyukazai Co., Ltd.)

Production of Acrylic Resin Aqueous Solution (W-2)

Into a reactor were fed 60 parts of butyl cellosolve and 15 parts of isobutyl alcohol. They were heated to 115° C. in a nitrogen atmosphere. Thereto was added, in 3 hours, a mixture consisting of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile. Aging was conducted at 115° C. for 30 minutes. Thereto was added, in 1 hour, a mixture consisting of 1 part of azobisisobutyronitrile and 115 parts of butyl cellosolve. Aging was conducted for 30 minutes. Filtration through a 20-mesh nylon cloth was conducted at 50° C. The resulting reaction product had an acid value of 48, a viscosity of Z4 as measured by a Gardner-Holdt bubble viscometer, a non-volatile content of 55% and a Tg of 45° C. The product was neutralized with dimethylaminoethanol in equal equivalents, followed by addition of deionized water to obtain a 50% acrylic resin aqueous solution (W-2).

| Production of metallic aqueous coating composition (M-1) | |
| --- | --- |
| Acrylic resin aqueous dispersion (W-1) | 275 parts |
| Acrylic resin aqueous solution (W-2) | 40 parts |
| Cymel 350 (amino resin, a product of Mitsui Toatsu Chemicals, Inc.) | 25 parts |
| Aluminum paste (AW-500B, a product of Asahi Chemical Metals Industry Co., Ltd.) | 20 parts |
| Butyl cellosolve | 20 parts |
| Deionized water | 253 parts |

The above materials of the above proportions were mixed. Thereto was added Thixol K-130B (a thickener, a product of Kyoeisha Chemical Co., Ltd.) and the viscosity of the mixture was adjusted to 3,000 cps as measured by a Brookfield viscometer (rotor rpm=6 rpm) to obtain a metallic aqueous coating composition (M-1) having a non-volatile content of about 19%.

| Production of white aqueous coating composition (S-1) | |
| --- | --- |
| Acrylic resin aqueous solution (W-2) | 40 parts |
| Titanium dioxide | 100 parts |
| Butyl cellosolve | 20 parts |

The above materials of the above proportions were dispersed to particle sizes of 5μ or smaller by the use of a pebble mill. Thereto were added the following materials of the following proportions.

| Acrylic resin aqueous dispersion (W-1) | 275 parts |
| --- | --- |
| Cymel 350 (amino resin, a product of Mitsui Toatsu Chemicals, Inc.) | 25 parts |
| Deionized water | 111 parts |

The mixture was subjected to viscosity adjustment to 2,500 cps in the same manner as above, to obtain a white aqueous coating composition (S-1) having a non-volatile content of about 30%.

Production of High-Solid-Content Coating Compositions

Production of Half Ester (C-1) by Addition Reaction of Polyol and 1,2-Acid Anhydride Into a 5-liter glass flask equipped with a stirrer, a thermometer and a cooler were fed 236 parts of 3-methyl-1,5-pentanediol, 134 parts of trimethylolpropane, 1,078 parts of hexahydrophthalic anhydride and 780 parts of xylene. The flask contents were heated to 120° C. in a nitrogen atmosphere to give rise to a reaction. The reaction mixture was kept at that temperature for 4 hours and then cooled to obtain a solution of a half ester (C-1), having a solid content of 65%, a Gardner viscosity (25° C.) of R and an acid value of 271 mg KOH/g.

Production of Vinyl Type Polymer (D-1) Having Epoxy Group, Hydroxyl Group and Hydrolyzable Alkoxysilyl Group Into a 5-liter glass flask equipped with a stirrer, a thermometer and a cooler were fed 410 parts of xylene and 77 parts of n-butanol. The flask contents were heated to 125° C. by the use of an electric mantle heater. Thereto was dropwise added, at that temperature, a mixture having the following monomer composition, in 4 hours at a constant rate. Incidentally, azobisisobutyronitrile in the mixture is a polymerization initiator.

| Glycidyl methacrylate | 504 parts (35%) |
| --- | --- |
| 4-Hydroxy-n-butyl acrylate | 216 parts (15%) |
| γ-Methacryloxypropyltriethoxysilane | 216 parts (15%) |
| n-Butyl acrylate | 216 parts (15%) |
| Styrene | 288 parts (20%) |
| Azobisisobutyronitrile | 72 parts |

Then, aging was conducted for 30 minutes. Thereto was dropwise added, in 2 hours, a mixture of 90 parts of xylene, 40 parts of n-butanol and 14.4 parts of azobisisobutyronitrile. Thereafter, aging was conducted for 2 hours to obtain a solution of an acrylic polymer (D-1)(final polymerization degree=100%).

The polymer solution had a polymer solid content of 70% and a Gardner viscosity (25° C.) of V. The polymer had a number-average molecular weight of 2,000, an epoxy group content of 2.12 mM/g, a hydroxyl value of 78 mg KOH/g and an ethoxysilyl group content of 1.55 mM/g.

Production of Vinyl Type Polymer (D-2) for Comparison Having Epoxy Group and Hydroxyl Group A solution of an acrylic polymer (D-2) (final polymerization degree=100%) was obtained in the same manner as in production of the vinyl polymer (D-1) except that the monomer composition was changed to the following.

| Glycidyl methacrylate | 432 parts (30%) |
| --- | --- |
| 4-Hydroxy-n-butyl acrylate | 288 parts (20%) |
| n-Butyl acrylate | 432 parts (30%) |
| Styrene | 288 parts (20%) |

The polymer solution had a polymer solid content of 70% and a Gardner viscosity (25° C.) of U. The polymer had a number-average molecular weight of 2,000, an epoxy group content of 2.12 mM/g, a hydroxyl value of 78 mg KOH/g and an alkoxysilyl group content of 0 mM/g.

Production of Vinyl Type Polymer (D-3) for Comparison Having Epoxy Group

A solution of an acrylic polymer (D-3) (final polymerization degree=100%) was obtained in the same manner as in production of the vinyl polymer (D-1) except that the monomer composition was changed to the following.

| Glycidyl methacrylate | 432 parts (30%) |
| --- | --- |
| n-Butyl acrylate | 720 parts (50%) |
| Styrene | 288 parts (20%) |

The polymer solution had a polymer solid content of 70% and a Gardner viscosity (25° C.) of S. The polymer had a number-average molecular weight of 2,000, an epoxy group content of 2.12 mM/g, a hydroxyl value of 0 mg KOH/g and an alkoxysilyl group content of 0 mM/g.

Production of Crosslinked Polymer Fine Particles (F-1)

Into a 1-liter flask equipped with a stirrer, a thermometer, a cooler and a mantle heater were fed 3,547.5 parts of deionized water and 20 parts of 50% Latemul S-120A (trade name, a sulfosuccinic acid type allyl group-containing anionic reactive emulsifier, a product of Kao Corporation). The flask contents were heated to 90° C. with stirring. Thereto was added 20% of a solution of 12.5 parts of a water-soluble azoamide polymerization initiator "VA-086" (trade name, 2,2'-azobis[2-methyl-N-(2-hydroxyethyl)-propionamide], a product of Wako Pure Chemical Industries, Ltd.) dissolved in 500 parts of deionized water.

15 minutes later, there was added 5% of a monomer mixture consisting of 150 parts of styrene, 550 parts of methyl methacrylate, 150 parts of n-butyl acrylate, 50 parts of 2-hydroxyethyl acrylate and 100 parts of 1,6-hexanediol diacrylate. The resulting mixture was stirred for 30 minutes, after which the dropwise addition of the remaining monomer mixture and the remaining aqueous polymerization initiator solution was started. The dropwise addition of the monomer mixture was conducted in 3 hours and the dropwise addition of the aqueous polymerization initiator solution was conducted in 3.5 hours with the system temperature being kept at 90° C. to give rise to polymerization. After the completion of the dropwise addition of the aqueous polymerization initiator solution, the system was kept at 90° C. for 30 minutes. Then, the system was cooled to room temperature and filtered through a filter cloth to obtain an aqueous dispersion of crosslinked polymer fine particles, having a solid content of 20%.

The aqueous dispersion was dried on a stainless steel vat in a hot air type electric drier of 60° C. to obtain a solid resin. The solid resin was dispersed in a xylene/n-butyl alcohol (50/50 by weight) mixed solvent of 60° C. to obtain a dispersion of crosslinked polymer fine particles (F-1), having a solid content of 15%.

The dispersion had a Gardner viscosity (25° C.) of A2. The crosslinked polymer fine particles had an average particle diameter of 70 nm as measured by Nanosizer N-4, a product of Coulter Co.

Production of High-Solid-Content Coating Compositions (3-a) to (3-e)

Five mixed resin solutions were prepared according to the formulations (expressed in solid content) shown in Table 1. To each solution were added 2 parts of an equal equivalent mixture of tetrabutylammonium bromide and monobutyl phosphate, 1 part of Tinuvin 900 (trade name, ultraviolet absorber, a product of Ciba-Geigy Japan Ltd.) and 0.1 part of BYK-300 (trade name, surface conditioner, a product of Big Chemie Co.), after which Swasol 1000 (trade name, hydrocarbon solvent, a product of Cosmo Oil Co., Ltd.) was added for viscosity adjustment to 25 seconds as measured at 20° C. by Ford Cup #4, to obtain high-solid-content coating compositions (3-a) to (3-e). The solid content of each composition at the time of application is shown in Table 1.

TABLE 1

|  |  | High-solid-content coating compositions | | | | |
|---|---|---|---|---|---|---|
|  |  | 3-a | 3-b | 3-c | 3-d | 3-e |
| Formulation | Compound (C) C-1 | 30 | 30 | 30 | 33 | 30 |

TABLE 1-continued

|  |  | High-solid-content coating compositions | | | | |
|---|---|---|---|---|---|---|
|  |  | 3-a | 3-b | 3-c | 3-d | 3-e |
| (parts by weight) | Polymer (D) | | | | | |
|  | D-1 | 60 |  |  | 67 | 60 |
|  | D-2 (comparison) |  | 60 |  |  |  |
|  | D-3 (comparison) |  |  | 60 |  |  |
|  | Reactive organopolysiloxane (E) X41-1067* | 10 | 10 | 10 |  | 10 |
|  | Crosslinked polymer fine particles (F) F-1 | 3 | 3 | 3 | 3 |  |
| Solid content when applied (% by weight) | | 66 | 59 | 56 | 56 | 66 |

*X41-1067: a trade name of Shin-Etsu Chemical Co., Ltd.; an organopolysiloxane containing glycidyl groups and methoxysilyl groups, represented by the following formula; molecular weight = 740.

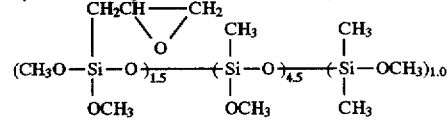

[Examples 1–3 and Comparative Examples 1–7]

A zinc phosphate-treated iron plate (a material to be coated) was dipped in a cationic electro-coatable coating composition bath. An electric current was allowed to flow between the iron plate and an anode (an opposite electrode) for 3 minutes at such a voltage that the formed electrocoating film had a thickness of 20µ after baking. The resulting iron plate was water-washed and then heated at 170° C. for 20 minutes in an atmosphere containing 10 ppm of $NO_2$, to cure the electrocoating film. On this electrocoating film was applied, as a first top coat, the aqueous coating composition (M-1) or (S-1) by the use of a spray gun (Devilbiss SGA 502, 25° C., 70% humidity) so that the formed film had a thickness (as cured) of 10–20µ (M-1) or 25–40µ (S-1), after which the film was dried under the baking conditions shown in Table 2. On the thus-formed film of the aqueous coating composition was applied, as a second top coat, one of the high-solid-content coating compositions (3-a) to (3-e) by air spray coating so that the formed film had a thickness (as dried) of 40 µm, after which the film was cured under the baking conditions shown in Table 2.

The above coating steps and the evaluations of the formed coating films are shown in Table 2.

TABLE 2

|  |  |  |  | Examples | | |
|---|---|---|---|---|---|---|
|  |  |  |  | 1 | 2 | 3 |
| Coating steps | Electro-deposition | Symbol of coating composition | | 1-a | 1-a | 1-a |
|  |  | Baking conditions (°C. × min) | |  | 170 × 20 |  |
|  | Intermediate coating | Symbol of coating composition | | — | — | — |
|  |  | Baking conditions (°C. × min) | | — | — | — |
|  | Top coating | Base coat (aqueous coating composition) | Symbol of coating composition | M-1 | M-1 | S-1 |
|  |  |  | Baking conditions (°C. × min) | 80 × 10 | 120 × 30 | 80 × 10 |
|  |  | Clear coat (high-solid- | Symbol of coating composition | 3-a | 3-a | 3-a |

TABLE 2-continued

|  |  | content coating composition) | Baking conditions (°C. × min) | 150 × 30 | | |
|---|---|---|---|---|---|---|
| Evaluation | Times of coating | | | 3 | 3 | 3 |
| | Times of baking | | | 3 | 3 | 3 |
| | Pinhole-free film thickness (μm) | | | 55 | 56 | 56 |
| | Sagging-free film thickness (μm) | | | 50 | 50 | 49 |
| | Flat portion finishing | | | 1.0≦ | 1.0≦ | 1.0≦ |
| | Exposure durability | | | ○ | ○ | ○ |
| | Chipping resistance | | | ○ | ○ | ○ |
| | Acid resistance | | | A | A | A |
| | Abrasion resistance | | | A | A | A |
| | Water resistance | | | A | A | A |
| | Adhesivity after recoating | | | A | A | A |

| | | | | Comparative Examples | | | | | | |
|---|---|---|---|---|---|---|---|---|---|---|
| | | | | 1 | 2 | 3 | 4 | 5 | 6 | 7 |
| Coating steps | Electro-deposition | Symbol of coating composition | | 1-b | 1-a | 1-a | 1-a | 1-a | 1-b | 1-b |
| | | Baking conditions (°C. × min) | | | | | 170 × 20 | | | |
| | Intermediate coating | Symbol of coating composition | | — | | | | | | Conventional type (*1) |
| | | Baking conditions (°C. × min) | | — | | | | | | 140 × 30 |
| | Top coating | Base coat (aqueous coating composition) | Symbol of coating composition | M-1 | M-1 | M-1 | M-1 | M-1 | M-1 | M-1 |
| | | | Baking conditions (°C. × min) | | | | 80 × 10 | | | |
| | | Clear coat (high-solid-content coating composition) | Symbol of coating composition | 3-a | 3-b | 3-c | 3-d | 3-e | Conventional type (*2) | |
| | | | Baking conditions (°C. × min) | | | | 150 × 30 | | | |
| Evaluation | Times of coating | | | 3 | 3 | 3 | 3 | 3 | 3 | 4 |
| | Times of baking | | | 3 | 3 | 3 | 3 | 3 | 3 | 4 |
| | Pinhole-free film thickness (μm) | | | 55 | 56 | 57 | 56 | 60 | 60 | 60 |
| | Sagging-free film thickness (μm) | | | 50 | 45 | 44 | 45 | 35 | 50 | 50 |
| | Flat portion finishing | | | 1.0≦ | 0.8 | 0.7 | 0.7 | 1.0≦ | 0.7 | 1.0≦ |
| | Exposure durability | | | × | ○ | ○ | ○ | ○ | × | ○ |
| | Chipping resistance | | | × | × | × | × | Δ | × | ○ |
| | Acid resistance | | | A | A | B | C | A | C | C |
| | Abrasion resistance | | | A | C | C | B | A | C | C |
| | Water resistance | | | A | B | C | B | A | A | A |
| | Adhesivity after recoating | | | A | B | C | B | A | A | A |

Notes for Table 2

(*1) Intermediate Coating of Conventional Type

This is an intermediate coating of solvent-based amino-alkyd resin type. It was coated on the cured film of electrodepositable coating composition, by the use of a spray coater so as to give a coating film of 30μ as cured, and then cured at 140° C. for 30 minutes.

(*2) Top Coating of Conventional Type

This is a clear coat of organic solvent-based thermosetting acrylic resin type (Magicron HK-1, a product of Kansai Paint Co., Ltd.). It was coated on the uncured film of base coat [aqueous coating composition (M-1)] so as to give a coating film of 40μ as cured, followed by heating at 150° C. for 30 minutes to simultaneously cure the previously-formed base coat film and the newly-formed clear coat film.

Coatability was tested as follows.

Pinhole-Free Film Thickness

A maximum film thickness (μm) was measured at which no pinhole was formed when coating was made on a vertical plane at rest.

Sagging-Free Film Thickness

A maximum film thickness (μm) was measured at which no sagging occurred when coating was made on a vertical plane at rest.

Performances of each coating film formed were tested as follows.

Flat Portion Finishing

Measured by the use of a portable distinctness-of-image-gloss meter (PGD-IV Model, a product of JAPAN COLOUR RESEARCH INSTITUTE). A larger value indicates better distinctness of image gloss.

Exposure Durability

A coated plate was exposed to 200-hour accelerated exposure in a sunshine weatherometer (light amount=1,100 K Joule/$m^2$.hr), followed by immersion in water of 40° C. for 24 hours. This test (1 cycle) was conducted 25 times (25 cycles). On the resulting coated plate were formed 100 squares of 2 mm×2 mm by cutting, a tape was adhered thereon, and the tape was peeled, in accordance with JIS K 5400 8.5.2 (cross-cutting, followed by tape adhesion and peeling). The degree of peeling of the squares was rated by the following yardstick.

○: No peeling between individual coating films.

X: Partial or complete peeling between electrodeposited coating film and base coat film.

Chipping Resistance

The following test was conducted.

(1) Tester: Q-G-R Gravelometer (Q Panel Co.)

(2) Size of stones sprayed: crushed stones of about 15–20 mm in diameter (3) Volume of stones sprayed: about 500 ml (4) Pressure of spraying air: about 4 kg/$cm^2$ (5) Temperature during test: about 20° C.

A test piece was fixed to a holder therefor; crushed stones of about 500 ml were hit against the test piece at an air pressure of about 4 kg/$cm^2$; and the coating film surface of the test piece was observed visually and rated according to the following yardstick.

- ○ (good): Part of the top coating film had very slight damage caused by hitting impact, but the electrodepositable coating film showed no peeling.
- Δ (slightly poor): The top coating film and the intermediate coating film had damage caused by the hitting impact and, moreover, the electrodepositable coating film showed slight peeling.
- X (poor): The top coating film and the intermediate coating film had severe damage caused by the hitting impact and, moreover, the electrodepositable coating film showed considerable peeling.

Acid Resistance

A coated plate was half-dipped in a 40% sulfuric acid solution at 50° C. for 5 hours, then water-washed, and observed for the coating film surface. The acid resistance of the coated plate was evaluated according to the following standard.

- A: No change
- B: No abnormality is seen on the coating film surface, but a slight difference in level is seen at the boundary between the dipped portion and the non-diped portion.
- C: The coating film surface shows whitening.

Abrasion Resistance

A coated plate was attached onto an automobile; the automobile was subjected to 15 times washing by the use of a car washer; and the surface condition of the coating film of the coated plate was observed. The car washer used was PO 20FWRC produced by Yasui Sangyo Co. The abrasion resistance of the coated plate was evaluated according to the following standard.

- A: Substantially no abrasion is found by visual inspection.
- B: Very slight abrasion is found by visual inspection.
- C: Noticeable abrasion is found by visual inspection.

Water Resistance

A coated plate was dipped in water of 40° C. for 240 hours, water-washed, and observed for the coating film surface. The water resistance of the coated plate was evaluated according to the following standard.

- A: No change
- B: Slight matting is seen.
- C: The coating film surface shows whitening.

Adhesivity After Recoating

Each coating composition was applied and baked at 150° C. for 30 minutes. Thereonto were applied the same top coats (base coat and clear coat) in the same manners, followed by baking at 120° C. for 30 minutes. Then, cross-cutting was conducted for the resulting coating film, at intervals of 1 mm to form 100 squares in the film; a cellophane tape was adhered onto the film and peeled; in this case, the adhesivity (or peeling) between the film formed before the second application of the top coats and the film formed by the second application was examined. The adhesivity was evaluated according to the following standard.

- A: No peeling
- B: Slight peeling
- C: Severe peeling

What is claimed is:

1. A coating method comprising:
   (1) applying by electrodeposition, onto a material to be coated, a cationic electrodepositable coating composition comprising:
      (A) a polyurethane-modified epoxy resin-amine adduct obtained by a reaction of (A-1) a polyurethane compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule; (A-2) a bisphenol epoxy resin having at least two epoxy groups in the molecule; and (A-3) an active-hydrogen-containing amine compound, and
      (B) a nonionic film-forming resin, to form an electrocoating film, the resin (A)/the resin (B) being in a weight ratio of 15/85 to 95/5 and the coating composition comprising substantially no pigment, and then heat-curing the formed electrocoating film,
   (2) applying, onto the cured electrocoating film, without applying any intermediate coating composition, an aqueous coating composition comprising a metallic pigment, a coloring pigment or a mixture thereof, as a first top coat, to form a first coating film, and then heat-curing the formed first coating film, and
   (3) applying thereonto, as a second top coat, a coating composition having a higher solid content than the aqueous coating composition comprising:
      (C) a carboxyl group-containing compound,
      (D) a vinyl polymer containing, in the molecule, an epoxy group, a hydroxyl group and a hydrolyzable alkoxysilyl group,
      (E) a reactive organopolysiloxane, and
      (F) crosslinked polymer fine particles but comprising substantially no pigment, to form a second coating film, and then heat-curing the formed second coating film.

2. A coating method comprising:
   (1) applying by electrodeposition, onto a material to be coated, a cationic electrodepositable coating composition comprising:
      (A) a polyurethane-modified epoxy resin-amine adduct obtained by a reaction of (A-1) a polyurethane compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule; (A-2) a bisphenol epoxy resin having at least two epoxy groups in the molecule; and (A-3) an active-hydrogen-containing amine compound, and
      (B) a nonionic film-forming resin, to form an electrocoating film, the resin (A)/the resin (B) being in a weight ratio of 15/85 to 95/5 and the coating composition comprising substantially no pigment, and then heat-curing the formed electrocoating film,
   (2) applying, onto the cured electrocoating film, without applying any intermediate coating composition, an aqueous coating composition comprising a metallic pigment, a coloring pigment or a mixture thereof, as a first top coat, to form a first coating film, and without substantially heat-curing the formed first coating film,
   (3) applying thereonto, as a second top coat, a coating composition having a higher solid content than the aqueous coating composition comprising:
      (C) a carboxyl group-containing compound,
      (D) a vinyl polymer containing, in the molecule, an epoxy group, a hydroxyl group and a hydrolyzable alkoxysilyl group,
      (E) a reactive organopolysiloxane, and (F) crosslinked polymer fine particles but comprising substantially no pigment, to form a second coating film, and (4) heating the resulting material to simultaneously cure the first and second coating films.

3. A method according to claim 1 or 2, wherein the polyhydroxy compound (a) has hydroxyl equivalents of 25–4,000.

4. A method according to claim 1 or 2, wherein the polyhydroxy compound (a) is selected from the group consisting of ethylene glycol, propylene glycol, 1,6-hexanediol and N-methyldiethanolamine.

5. A method according to claim 1 or 2, wherein the polyisocyanate compound (b) is selected from the group consisting of aliphatic, alicyclic or aromatic-aliphatic polyisocyanate compounds.

6. A method according to claim 1, wherein the polyisocyanate compound (b) is selected from the group consisting of hexamethylene diisocyanate, isophorone diisocyanate and hydrogenated 4,4'-diphenylmethane diisocyanate.

7. A method according to claim 1 or 2, wherein the compound (c) having one active hydrogen atom in the molecule is selected from the group consisting of a monohydric alcohol, a monocarboxylic acid, a monohydric thiol, a secondary amine, an oxime and a compound obtained by converting, into an aldimine, a ketimine, oxazoline or imidazoline, the primary amino group of an amine compound having one secondary amino or hydroxyl group and one or more primary amino groups.

8. A method according to claim 1 or 2, wherein the compound (c) having one active hydrogen atom in the molecule has a molecular weight of 30–2,000.

9. A method according to claim 1 or 2, wherein the polyurethane compound (A-1) is obtained by a reaction of 10–94% by weight of the polyhydroxy compound (a), 5–80% by weight of the polyisocyanate compound (b) and 1–85% by weight of the compound (c) having one active hydrogen atom in the molecule, all of said amounts being based on the total amount of (a), (b) and (c).

10. A method according to claim 1 or 2, wherein the polyurethane compound (A-2) has a number-average molecular weight of 400–10,000.

11. A method according to claim 1 or 2, wherein the bisphenol epoxy resin (A-2) is a diglycidyl ether of a bisphenol compound.

12. A method according to claim 11, wherein the diglycidyl ether of a bisphenol compound is a diglycidyl ether of bisphenol A represented by the following formula

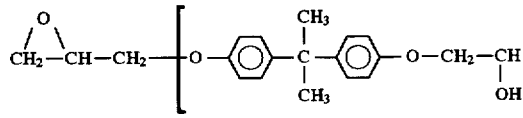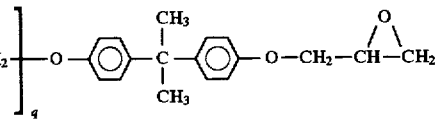

wherein q is an integer of 2–20.

13. A method according to claim 1 or 2, wherein the bisphenol epoxy resin (A-2) has a number-average molecular weight of about 310–10,000 and epoxy equivalents of about 155–5,000.

14. A method according to claim 1 or 2, wherein the active-hydrogen-containing amine compound (A-3) is selected from the group consisting of a compound obtained by converting, into an aldimine, a ketimine, oxazoline or imidazoline, the primary amino group of an amine compound having one secondary amino group and one or more primary amino groups, a secondary monoamine, and a compound obtained by converting, into a ketimine, the primary amino group of an alkanolamine.

15. A method according to claim 14, wherein the active-hydrogen-containing amine compound (A-3) is diethanolamine or a ketimine made from diethylenetriamine.

16. A method according to claim 1 or 2, wherein the polyurethane-modified epoxy resin-amine adduct (A) is obtained by reacting the secondary hydroxyl group of the bisphenol epoxy resin (A-2) with the polyurethane compound (A-1) and then adding, to the terminal oxirane group of the resulting polyurethane-modified epoxy resin, the active-hydrogen-containing amine compound (A-3).

17. A method according to claim 1 or 2, wherein the polyurethane-modified epoxy resin-amine adduct (A) is obtained by a reaction of 16–80% by weight of the polyurethane compound (A-1), 20–80% by weight of the epoxy resin (A-2), said amounts being based on the total amount of (A-1), (A-2) and (A-3), and the active-hydrogen-containing amine compound (A-3) of such an amount that the resulting polyurethane-modified epoxy resin-amine adduct has an amine value of 15–100.

18. A method according to claim 1 or 2, wherein the polyurethane-modified epoxy resin-amine adduct (A) has a number-average molecular weight of 1,000–20,000.

19. A method according to claim 1 or 2, wherein the polyurethane-modified epoxy resin-amine adduct (A) contains a primary hydroxyl group in an amount of 600–1,000 equivalents.

20. A method according to claim 1 or 2, wherein the nonionic film-forming resin (B) has a number-average molecular weight of about 3,000–100,000 and has, in the molecule, a nonionic functional group crosslinkable with the blocked isocyanate group of the resin (A) or with an external curing agent during the curing of said electrocoating film.

21. A method according to claim 20, wherein the nonionic functional group is a hydroxyl group.

22. A method according to claim 1 or 2, wherein the nonionic film-forming resin (B) is selected from the group consisting of an acrylic resin, a polyester resin, a polyester-modified acrylic resin, an acrylic resin-modified polyester resin and a silicone-modified resin.

23. A method according to claim 22, wherein the nonionic film-forming resin (B) is a polyester-modified nonionic acrylic resin wherein the amount of the polyester grafted is 5–80% by weight based on the total of the resin.

24. A method according to claim 1 or 2, wherein the weight ratio of the resin (A)/the resin (B) is 30/70 to 90/10.

25. A method according to claim 1 or 2, further comprising an external crosslinking agent.

26. A method according to claim 25, wherein the external crosslinking agent is selected from the group consisting of a blocked polyisocyanate, a β-hydroxycarbamic acid ester of a polyamine, a malonic acid ester, a malonic acid ester derivative, methylolmelamine and methylolurea.

27. A method according to claim 25, wherein the weight ratio of the total of the resin (A) and the resin (B) to the external crosslinking agent is 100/0 to 60/40.

28. A method according to claim 27, wherein the weight ratio of the total of the resin (A) and the resin (B) to the external crosslinking agent is 85/15 to 75/25.

37

29. A method according to claim 1 or 2, wherein the cationic electrodepositable coating composition is electrodeposited with stirring, under the following conditions:
bath temperature: 20°–30° C.,
voltage: 100–400 V,
current density: 0.01–3 A/dm$^2$,
electrodeposition time: 1–5 minutes,
anode/cathode areal ratio: 2/1 to 1/2, and
distance between electrodes: 10–100 cm.

30. A method according to claim 1 or 2, wherein the electrocoating film is cured at a temperature of about 140°–180° C.

31. A method according to claim 1 or 2, wherein the film thickness of the electrocoating film is 5–40 μm after curing.

32. A method according to claim 1 or 2, wherein the aqueous coating composition as a first top coat is composed mainly of a base resin, a curing agent, a metallic pigment, a coloring pigment or a mixture thereof, and water.

33. A method according to claim 32, wherein the base resin is a resin which contains, as a base material, an acrylic resin, a polyester resin, an epoxy resin or a urethane resin and which can be made water-soluble or water-dispersible.

34. A method according to claim 32, wherein the amounts of the base resin and the curing agent present in the aqueous coating composition are 60–90% by weight and 40-10% by weight, respectively, based on the total weight of the base resin and the curing agent.

35. A method according to claim 32, wherein the amount of the metallic pigment, the coloring pigment or a mixture thereof present in the aqueous coating composition is about 1–250 parts by weight per 100 parts by weight of the total of the base resin and the curing agent.

36. A method according to claim 1 or 2, wherein the film thickness of the first coating film is 10–50 μm after curing.

37. A method according to claim 1 or 2, wherein the carboxyl group-containing compound (C) has an acid value of 50–500 mg KOH/g.

38. A method according to claim 1 or 2, wherein the carboxyl group-containing compound (C) is selected from the group consisting of:
(C-1) a vinyl polymer containing, in the molecule, a group obtained by half-esterifying an acid anhydride group,
(C-2) a carboxyl group-containing polyester polymer having a number-average molecular weight of 1,500–2,000, and
(C-3) a low-molecular half ester having a number-average molecular weight of 400–1,000, obtained by an addition reaction between a polyol and a 1,2-acid anhydride.

39. A method according to claim 1 or 2, wherein the carboxyl group-containing compound (C) is selected from the group consisting of:
(C-1) a vinyl polymer containing, in the molecule, a group obtained by half-esterifying an acid anhydride group, and
(C-3) a low-molecular half ester having a number-average molecular weight of 400–1,000, obtained by an addition reaction between a polyol and a 1,2-acid anhydride.

38

40. A method according to claim 1 or 2, wherein the vinyl polymer (D) containing, in the molecule, an epoxy group, a hydroxyl group and a hydrolyzable alkoxysilyl group has an epoxy group content of 0.5–5 mM/g.

41. A method according to claim 1 or 2, wherein the vinyl polymer (D) containing, in the molecule, an epoxy group, a hydroxyl group and a hydrolyzable alkoxysilyl group has a hydroxyl value of 10–200 mg KOH/g.

42. A method according to claim 1 or 2, wherein the vinyl polymer (D) containing, in the molecule, an epoxy group, a hydroxyl group and a hydrolyzable alkoxysilyl group has a hydrolyzable alkoxysilyl group content of 0.3–5 mM/g.

43. A method according to claim 1 or 2, wherein the hydrolyzable alkoxysilyl group of the vinyl polymer (D) containing, in the molecule, an epoxy group, a hydroxyl group and a hydrolyzable alkoxysilyl group is a triethoxysilyl group or a methyldiethoxysilyl group.

44. A method according to claim 1 or 2, wherein the vinyl polymer (D) containing, in the molecule, an epoxy group, a hydroxyl group and a hydrolyzable alkoxysilyl group has a number-average molecular weight of 2,000–10,000.

45. A method according to claim 1 or 2, wherein the reactive organopolysiloxane (E) has a number-average molecular weight of 100–10,000 and 2–300 silicon atoms.

46. A method according to claim 1 or 2, wherein the reactive organopolysiloxane (E) contains, as the reactive functional group, an alkoxysilyl group, an alcoholic hydroxyl group or a glycidyl group.

47. A method according to claim 1 or 2, wherein the crosslinked polymer fine particles (F) have an average particle diameter of 0.01–2 μm.

48. A method according to claim 1 or 2, wherein the high-solid-content coating composition as second top coat comprises the carboxyl group-containing compound (C) and the vinyl polymer (D) containing, in the molecule, an epoxy group, a hydroxyl group and a hydrolyzable alkoxysilyl group, in such proportions that the equivalent ratio of the carboxyl group of the compound (C) to the epoxy group of the polymer (D) becomes 1:0.5 to 0.5:1; comprises the reactive organopolysiloxane (E) in an amount of 3–50 parts by weight per 100 parts by weight of the total of the compound (C) and the polymer (D); and comprises the crosslinked polymer fine particles (F) in an amount of 1–20 parts by weight per 100 parts by weight of the total of the compound (C), the polymer (D) and the reactive organopolysiloxane (E).

49. A method according to claim 1 or 2, wherein the high-solid-content coating composition further comprises a curing catalyst.

50. A method according to claim 1 or 2, wherein the film of the high-solid-content coating composition has an as-dried thickness of 10–80 μm.

51. A method according to claim 1 or 2, wherein the film of the second coating film is cured at a temperature of about 120°–170° C.

52. A coated article formed by a coating method of claim 1 or 2.

* * * * *